(12) United States Patent
Miles et al.

(10) Patent No.: US 9,473,729 B2
(45) Date of Patent: Oct. 18, 2016

(54) TELEVISION DISPLAY

(75) Inventors: Marisa Miles, Middlesex (GB); Gerry David O'Sullivan, Middlesex (GB); Robin Crossley, Middlesex (GB); Nicholas James, Isleworth (GB)

(73) Assignee: Sky UK Limited, Middlesex (GB)

( * ) Notice: Subject to any disclaimer, the term of this patent is extended or adjusted under 35 U.S.C. 154(b) by 399 days.

(21) Appl. No.: 12/738,830

(22) PCT Filed: Oct. 17, 2008

(86) PCT No.: PCT/GB2008/003540
§ 371 (c)(1),
(2), (4) Date: Feb. 3, 2011

(87) PCT Pub. No.: WO2009/050489
PCT Pub. Date: Apr. 23, 2009

(65) Prior Publication Data
US 2011/0179451 A1  Jul. 21, 2011

(30) Foreign Application Priority Data

Oct. 19, 2007  (GB) .................................. 0720547.9

(51) Int. Cl.
*H04N 5/445* (2011.01)
*H04N 21/482* (2011.01)
*H04N 21/431* (2011.01)
(Continued)

(52) U.S. Cl.
CPC .......... *H04N 5/44543* (2013.01); *H04N 5/445* (2013.01); *H04N 21/4147* (2013.01); *H04N 21/4312* (2013.01); *H04N 21/4325* (2013.01); *H04N 21/4334* (2013.01); *H04N 21/4622* (2013.01); *H04N 21/47214* (2013.01); *H04N 21/482* (2013.01); *H04N 21/485* (2013.01); *H04N 21/4821* (2013.01); *H04N 21/4828* (2013.01); *H04N 21/84* (2013.01); *H04N 21/4316* (2013.01); *H04N 21/4753* (2013.01); *H04N 21/4755* (2013.01);
(Continued)

(58) Field of Classification Search
CPC ..................... H04N 21/4147; H04N 21/4312; H04N 21/4316; H04N 21/4622; H04N 21/485; H04N 5/445; H04N 5/44543; H04N 2005/44547; H04N 2005/44556; H04N 2005/44565; H04N 21/482; H04N 21/4821
See application file for complete search history.

(56) References Cited

U.S. PATENT DOCUMENTS 6,481,012 B1  11/2002  Gordon et al.
6,505,348 B1  1/2003  Knowles
(Continued)

FOREIGN PATENT DOCUMENTS

EP  0994408 A3  4/2000
EP  1259070 A2  11/2002
(Continued)

OTHER PUBLICATIONS

Search Report for Application No. GB0720547.9 dated Oct. 28, 2010, 2 pages.
(Continued)

*Primary Examiner* — Rong Le
(74) *Attorney, Agent, or Firm* — Kilpatrick Townsend & Stockton LLP

(57) ABSTRACT

Display features of an interactive user interface for a TV environment allow a user to interact with objects and/or information within a display space.

18 Claims, 16 Drawing Sheets

(51) Int. Cl.
*H04N 21/462* (2011.01)
*H04N 21/485* (2011.01)
*H04N 21/4147* (2011.01)
*H04N 21/432* (2011.01)
*H04N 21/433* (2011.01)
*H04N 21/472* (2011.01)
*H04N 21/84* (2011.01)
*H04N 21/475* (2011.01)

(52) U.S. Cl.
CPC ............ *H04N 2005/44547* (2013.01); *H04N 2005/44556* (2013.01); *H04N 2005/44565* (2013.01)

(56) References Cited

U.S. PATENT DOCUMENTS

| | | | |
|---|---|---|---|
| 6,526,577 B1 | 2/2003 | Knudson | |
| 7,363,645 B1 | 4/2008 | Hendricks | |
| 7,684,681 B1 | 3/2010 | Bodkin et al. | |
| 2002/0054068 A1* | 5/2002 | Ellis et al. | 345/716 |
| 2002/0083449 A1* | 6/2002 | Im | 725/39 |
| 2003/0021593 A1 | 1/2003 | Otsuka et al. | |
| 2003/0112467 A1* | 6/2003 | McCollum et al. | 358/1.18 |
| 2004/0015404 A1 | 1/2004 | McCarthy | |
| 2004/0034867 A1* | 2/2004 | Rashkovskiy et al. | 725/40 |
| 2004/0107439 A1 | 6/2004 | Hassell | |
| 2004/0230992 A1 | 11/2004 | Yuen et al. | |
| 2004/0244042 A1* | 12/2004 | Billmaier | 725/110 |
| 2004/0255336 A1 | 12/2004 | Logan et al. | |
| 2004/0261105 A1 | 12/2004 | Marshall et al. | |
| 2004/0263686 A1 | 12/2004 | Kim | |
| 2005/0028217 A1* | 2/2005 | Marler et al. | 725/112 |
| 2005/0188409 A1 | 8/2005 | Daniels | |
| 2005/0240965 A1 | 10/2005 | Watson et al. | |
| 2006/0015903 A1* | 1/2006 | MacBeth et al. | 725/46 |
| 2006/0083482 A1 | 4/2006 | Arora | |
| 2006/0123038 A1* | 6/2006 | Fenton et al. | 707/101 |
| 2006/0130093 A1 | 6/2006 | Feng et al. | |
| 2006/0277574 A1 | 12/2006 | Schein et al. | |
| 2007/0028270 A1* | 2/2007 | Ostojic et al. | 725/53 |
| 2007/0101185 A1* | 5/2007 | Ostrowka | 714/6 |
| 2007/0250864 A1 | 10/2007 | Diaz Perez | |
| 2007/0256103 A1 | 11/2007 | Knudson | |
| 2007/0277201 A1 | 11/2007 | Wong et al. | |
| 2008/0178218 A1* | 7/2008 | Pickelsimer | 725/40 |
| 2009/0210915 A1 | 8/2009 | Millman et al. | |
| 2011/0276995 A1* | 11/2011 | Alten et al. | 725/39 |
| 2012/0324518 A1* | 12/2012 | Thomas et al. | 725/87 |
| 2013/0097639 A1* | 4/2013 | Yuen et al. | 725/43 |

FOREIGN PATENT DOCUMENTS

| | | |
|---|---|---|
| EP | 1702460 A2 | 9/2006 |
| EP | 1968313 A1 | 2/2007 |
| JP | 09305187 A | 11/1997 |
| WO | WO 96/07270 A1 | 3/1996 |
| WO | WO 96/37996 A1 | 11/1996 |
| WO | WO 99/66721 A2 | 12/1999 |
| WO | WO 01/84831 A2 | 11/2001 |
| WO | WO 02/32140 A2 | 4/2002 |
| WO | WO 02/067579 A1 | 8/2002 |
| WO | WO 2005/069609 A2 | 7/2005 |
| WO | WO 2005/074262 A1 | 8/2005 |
| WO | WO 2006/081577 A2 | 8/2006 |
| WO | WO 2006/112894 A1 | 10/2006 |
| WO | WO 2007/149754 A2 | 12/2007 |
| WO | WO 2008/002378 A1 | 1/2008 |
| WO | WO 2008/020426 A1 | 2/2008 |

OTHER PUBLICATIONS

International Search Report and Written Opinion for International Application No. PCT/GB2008/003540 dated May 25, 2009, 17 pages.

Search Report for Application No. GB0720547.9 dated Mar. 25, 2008, 2 pages.

\* cited by examiner

TELEVISION DISPLAY

CROSS-REFERENCES TO RELATED APPLICATIONS

This application claims priority benefit under 35 U.S.C. §365(c) of International Patent Application Serial No. PCT/GB2008/003540, filed Oct. 17, 2008, which designated the United States (US), and to Great Britain Patent Application No. 0720547.9, filed Oct. 19, 2007, both of which are incorporated herein by reference in their entirety.

FIELD OF THE INVENTION

The present invention relates to television displays, and to apparatus, methods and computer programs for implementing such television displays.

BACKGROUND OF THE INVENTION

Electronic programme guides (EPGs) provide a user interface for the display of television programmes, such as audio and video programmes to the user. Interactive EPGs (IEPGs) allow the user to select programmes for viewing and/or recording. Examples of known IEPGs include those provided with the Sky™ and Sky+™ set-top boxes. Aspects of those IEPGs are described in WO 96/37996 and WO 99/66721.

IEPGs are typically designed for display on a television (TV) screen, and are therefore limited by the resolution of that screen. With the advent of High Definition TV (HDTV), higher resolution IEPGs are possible. However, the number of different channels available continues to increase and the user must typically navigate around the IEPG, or filter by search criteria, to find a programme of interest.

It is also desirable to include additional information in an IEPG, such as advertising or programme notes, and to provide additional functionality, such as Push and Pull Video On Demand (VOD), interactive TV content and user configurable options and preferences, all incorporated within the IEPG window.

With this increased amount of information for display, there is a need for an improved IEPG television display. It is sometimes stated facetiously that multi-channel television provides hundreds of channels but that there is nothing good to watch. Behind this joke lies a real problem, namely that television programming that a user is interested in may be spread over tens or hundreds of channels. The entire broadcast content of the Sky satellite platform currently amounts to some approximately 14,400 hours per day. Typically a viewer will watch about 2.9 hours of television programming a day. Therefore, a viewer watches about 0.02% of the available television programming. Finding this desired content therefore presents a real logistical problem that is only made more difficult by the ability to record around a hundred hours of programming and other non-linear modes of distribution such as pull-VOD. There is accordingly a need for an intuitive, easy to use means of navigating large quantities of television programming to find desired programmes.

STATEMENTS OF THE INVENTION

According to one aspect of the present invention, there is provided a method of providing an interactive user interface for a television display, the method comprising providing at least three levels of information in a display space, wherein a first level provides a plurality of user selectable first level entities each associated with a respective display section providing a different category of information and being selectable by a user independently of the other sections, wherein each first level entity is associated with a plurality of user selectable second level entities each associated with a respective data content sub-section of the display section of the associated first level entity, each respective data content sub-section being provided in a third level.

According to another aspect of the present invention, there is provided a method of providing an interactive user interface for a television display, the method comprising providing a display space including a data content region and a video data display region, wherein the data content region includes a plurality of user selectable entities each representing a viewable content item, wherein at least one viewable content item is part of a group of viewable content items, and wherein in response to a user command associated with a selected content item entity representing a viewable content item which is part of a group of viewable content items, a menu is displayed to the user with options relating to the group of viewable content items.

According to another aspect of the present invention, there is provided a method of providing an interactive user interface for a television display, the method comprising providing a display space including a data content region, the data content region including a plurality of user selectable entities each representing a viewable content item having a title, wherein at least one viewable content item is part of a group of viewable content items, and wherein each viewable content item in a group of viewable content items has the same title.

According to another aspect of the present invention, there is provided a method of providing an interactive user interface for a television display, the method comprising providing a display space including a data content region and an information region, the data content region including a plurality of user selectable entities each representing a recorded viewable content item, a viewable content item being recorded, or a viewable content item to be recorded, wherein information associated with a user selected entity is displayed in the information region and wherein additional information associated with a selected viewable content item is displayed in response to a user command.

According to another aspect of the present invention, there is provided a method of providing an interactive user interface for a television display, the method comprising providing a display space including a data content region, the data content region including a plurality of user selectable entities, each representing a recorded viewable content item stored in a hard disk (or other fast memory storage medium), and an indication of available memory in the hard disk (or other medium), wherein in response to a user command to delete a selected entity, the selected entity is removed from the data content region but the associated viewable content item is not deleted from the hard disk.

According to another aspect of the present invention, there is provided a method of providing an interactive user interface for a television display, the method comprising providing a display space including a data content region and a video data display region, wherein the data content region includes a plurality of user selectable menu entities each associated with a respective display section providing a different category of information and being selectable by a user independently of the other sections, wherein one of said plurality of user selectable menu entities is associated with a planner screen providing a list of user selectable entities each representing a recorded viewable content item, wherein in response to a user command to play back a selected entity, the recorded viewable content item is displayed in the video data display region and user play back control is enabled, and in response to a user command to select a different one of said plurality of user selectable menu entities associated with different display section, play back of the recorded viewable content continues in the video data display region but user play back control is disabled.

According to another aspect of the present invention, there is provided a method of providing an interactive user interface for a television display, the method comprising providing a display space including a plurality of user selectable menu entities each associated with a respective display section providing a different category of information and being selectable by a user independently of the other sections, wherein one of said plurality of user selectable menu entities is associated with a radio guide display section providing a list consisting of available digital radio stations.

According to another aspect of the present invention, there is provided a method of providing an interactive user interface for a television display, the method comprising providing a display space including a data content region and an information display region, wherein the data content region includes a plurality of user selectable menu entities each associated with a respective display section providing a different category of information and being selectable by a user independently of the other sections, wherein one of said plurality of user selectable menu entities is associated with a video on demand display section providing a list of user selectable media content items, wherein in response to a user command to display information associated with the selected media content item, the information display region alternates between displaying a synopsis of the selected media content item and a marketing message associated with the selected media content item.

According to another aspect of the present invention, there is provided a method of providing an interactive user interface for a television display, the method comprising providing a display space including a plurality of user selectable menu entities each associated with a respective display section providing a different category of information and being selectable by a user independently of the other sections, wherein one of said plurality of user selectable menu entities is associated with an options display section providing user customisation options and wherein another of said plurality of user selectable entities is associated with a separate settings display section providing user configurable technical settings.

According to another aspect of the present invention, there is provided a method of providing an interactive user interface for a television display, the method comprising providing a display space including a plurality of user selectable entities, wherein at least some of said plurality of user selectable entities are selectable by a numerical input command.

According to another aspect of the present invention, there is provided a method of providing an interactive user interface for a television display, the method comprising providing a display space including a data content region and a video data display region, wherein the data content region includes a plurality of user selectable entities each representing a viewable content item, and wherein in response to a first user selection of an entity, the selected entity is displayed in the video data display region of the display space, and in response to a successive second user selection of the entity, the selected entity is displayed to fill the television display.

According to another aspect of the present invention, there is provided a method of providing an interactive user interface for a television display, the method comprising providing a display space including a data content region and an inhibitable video data display region, wherein the data content region displays a greater amount of information when the video data display region is inhibited.

According to another aspect of the present invention, there is provided a method of providing an interactive user interface for a television display, the method comprising receiving programme scheduling data including title data, genre data and sub-genre data for a plurality of programmes, and providing a display space including a search display screen including user input fields for specifying search criteria including a genre, a sub-genre and characters from a programme title, wherein a search is conducted for programmes in the received programme scheduling data matching the user input search criteria.

According to another aspect of the present invention, there is provided a method of providing an interactive user interface for a television display, the method comprising receiving programme scheduling data including information associated with a currently viewed programme and at least two subsequent programmes to be broadcast after the currently viewed programme, and providing a display space for display over image data of a currently viewed programme, wherein the display space includes information associated with the currently viewed programme and information associated with two subsequent programmes.

According to another aspect of the present invention, there is provided a method of providing an interactive user interface for a television display, the method comprising receiving a continuous command from a user to navigate through information displayed in a display screen and increasing a navigation speed in dependence upon the length of time of said continuous command.

According to another aspect of the present invention, there is provided a method of providing an interactive user interface for a television display, the method comprising receiving programme scheduling data for a plurality of channels, and providing a display space for display over image data of a currently viewed programme, wherein the display space displays information associated with one channel from a first list of user navigatable available channels, and wherein in response to a user command, the display space switches between displaying information associated with the first list and information associated with a second list of navigatable channels, the second list of navigatable channels including a last tuned channel and a list of user-defined favourite channels.

According to another aspect of the present invention, there is provided a method of providing an interactive user interface for a television display having an associated aspect ratio, the method comprising providing a display space having a layout for a first aspect ratio and providing a display space having a different layout for a second aspect ratio.

According to another aspect of the present invention, there is provided a method of providing an interactive user interface for a television display, the method comprising providing a display space including a plurality of user selectable menu entities each associated with a respective display section providing a different category of information and being selectable by a user independently of the other sections, wherein unselected menu entities are represented with an icon and no text description, and wherein a selected menu entity is expanded and represented with an icon and text description in response to a user navigational command.

According to another aspect of the present invention, there is provided a method of providing an interactive user interface for a television display, the method comprising receiving programme scheduling data including title information associated with a currently viewed programme and at least two subsequent programmes to be broadcast after the currently viewed programme, and providing a display space for display over image data of a currently viewed programme, wherein the display space displays the title information of the currently viewed programme and subsequent programmes as a row of user selectable entities, wherein the entity for a currently selected entity is displayed with a larger width.

According to another aspect of the present invention, there is provided a method of providing an interactive user interface for a television display, the method comprising providing a display space including a data content region and an information region, the data content region including a list of user selectable entities each representing a recorded viewable content item, a viewable content item being recorded, or a viewable content item to be recorded, wherein in response to a user command to play a content item, the display space displays the data content region, and wherein if the entity representing the last viewed programme has not been deleted from the list of user selectable entities, the entity representing the last viewed programme is pre-selected in the data content region, otherwise, the first entity on the list is pre-selected in the data content region.

Apparatus and/or a computer program arranged to perform any of the above aspects of the invention may be provided.

BRIEF DESCRIPTION OF THE DRAWINGS

There now follows, by way of example only, a detailed description of preferred embodiments of the present invention in which.

DETAILED DESCRIPTION OF THE EMBODIMENTS

Television Display Apparatus

In this section, a conventional satellite broadcast receiver is described as an example of apparatus on which a television display may be implemented. It is not intended as limiting to the scope of the invention. Other types of television display apparatus may include cable TV or Internet TV (IPTV) apparatus. Additionally, the display apparatus may be any other audio/visual display apparatus, such as a personal computer, configured to receive and display television signals.

Figure 1:
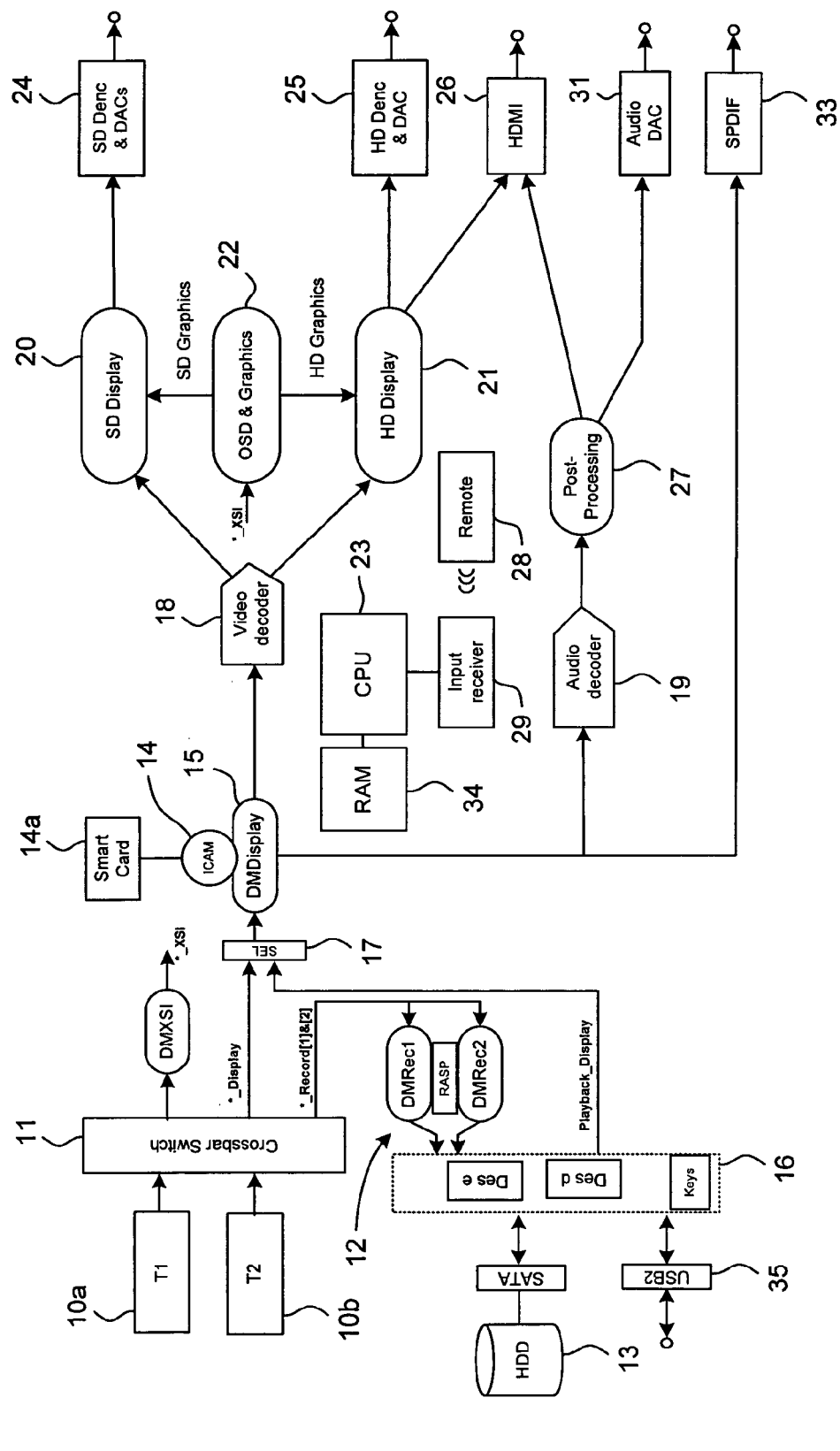
FIG. 1 is a block diagram of the functional components of a satellite broadcast receiver.

FIG. 1 shows a satellite broadcast receiver 3 for receiving television signals from a satellite television broadcast network. In this example, received signals are input to first and second tuners 10a and 10b but any number of tuners may be used in the receiver 3. The tuners 10a and 10b are tunable into the same or different channels of the satellite television broadcast network for simultaneous reception of the same or different television programmes. Signals from the first and second tuners 10a and 10b are passed to a crossbar switch 11 which separates the data received from the first and second tuners 10a and 10b into data for direct output to a television, data representing received television programmes for recording and subsequent playback, and user services and programme scheduling data, in accordance with the XSI standard, for example. The receiver 3 has a hard disk (or other memory medium) 13 which receives from the crossbar switch 11 compressed video and audio data for recording and subsequent playback via recording and playback circuitry 16. In the embodiment illustrated in FIG. 1, the receiver 3 includes two demultiplexer recording pipes (DMRec1 and DMRec2), which are coupled to Random Access Streaming Protocol circuitry (RASP) for analysing data in a received stream and indexing the data as it is received. The recording and playback circuitry 16 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) standard which permits both programme data and additional data (for example interactive service data) to be transmitted in a single channel. DVB/MPEG 2/4 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The receiver 3 therefore has an Integrated Conditional Access Module (ICAM) 14 which co-operates with a smart card 14a to determine whether the viewer has subscribed to a particular channel and is therefore authorised to access the channel. Parental control over channel access is also provided, at least in part, by the access control circuit 14. The receiver 3 further comprises a demultiplexing and descrambling circuit 15 which receives from a selector 17 data from the crossbar switch 11 for direct output or data from the hard disk 13 for playback. The demultiplexing and descrambling circuit 15 separates the data into video data and audio data for distribution to various locations within the receiver 3. The demultiplexing and descrambling circuit 15 is also controlled by the access control circuit 14 to enable the descrambling of the signal by authorised subscribers. The receiver 3 also comprises a video decoder 18 for decompression and processing of encoded video data received from the demultiplexing and descrambling circuit 15, and an audio decoder 19 for decompression and processing of compressed audio data, operating according to the MPEG 2/4 standard, for example.

Decompressed video data is supplied to standard definition display circuitry 20 and high definition display circuitry 21 which combines the decompressed video data with corresponding standard definition or high definition on-screen display and graphics generated by on-screen display and graphics generation circuitry 22 using the user services and programme scheduling data. The standard definition display circuitry 20 provides the combined standard definition video and graphics data to a standard definition digital encoder and Digital to Analogue Converters (DACs) 24 where the data is encoded and converted into an appropriate format for direct input to a television set. The high definition display circuitry 21 supplies the combined high definition video and graphics data to a high definition digital encoder and Digital to Analogue Converter (DAC) 25 where the data is encoded into an appropriate high definition format for output to a high definition TV if so desired. The combined high definition video and graphics data is also supplied to a High Definition Multimedia Interface (HDMI) interface 26 which also receives decompressed audio data from the audio decoder 19 via audio post-processing circuitry 27, for output to an HDMI input of a high definition TV if so desired. Decompressed and processed audio data is also supplied to an audio DAC 31 for direct input to an analogue audio device or speakers. The demultiplexing and descrambling circuit 15 also outputs compressed digital audio to a proprietary audio interface, for example in accordance with the Sony/Philips Digital Interconnect Format (SPDIF) 33 for direct input to appropriate audio equipment.

The receiver 3 is controlled by a processor 23 which communicates with the various units of the receiver via a bus (not shown). The processor 23 has associated with it Random Access Memory (RAM) 34. The processor 23 controls operation of the receiver 3 by tuning the tuners 10a and 10b to receive signals for the desired channels by controlling the demultiplexing, descrambling and decompression so that the desired programme and/or interactive service data is displayed on the screen of the TV, and by controlling the hard disk 13 to record desired television programmes or to play back previously recorded television programmes. Viewer selection of desired programmes and customer services is controlled by viewer manipulation of a remote control unit 28, which in response to such viewer manipulation transmits control signals to an input receiver 29 for input to the processor 23. The remote control unit 28 also allows the viewer to control of the operation of the hard disk 13 to record television programmes, to play back recorded television programmes and to program the recording of television programmes, etc.

Operation of the receiver 3 is controlled by software that makes the processor 23 responsive to control signals from the remote control unit 28 and/or additional data in the received signals. Interaction between hardware and software in the receiver 3 is described in detail in the Applicant's earlier international patent application published as WO 01/11865. Operation of the receiver 3 in receiving and decoding data representing television programmes and data defining scheduling and other information related to the programmes is described in detail in the Applicant's earlier international patent application published as WO 96/37996. Operation of the receiver 3 in providing interactive services is described in the Applicant's earlier international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211—DVB SI Guidelines. The receiver 3 is designed to support the SI specification.

In addition to operating data for use in controlling access to channels, additional data in a channel can include brief programme schedule data representative of so-called event information tables (EITs) defining the scheduling of programmes in each channel. The programme schedule data is stored in the RAM 34 and, once stored, the scheduling information is available effectively instantaneously. Alternatively, the programme schedule data may be stored in the hard disk 13. The programme schedule data is transmitted regularly so that the receiver 3 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 13. The information transmitted via this dedicated channel is updated more frequently and covers a longer period of time (e.g. two weeks). As a consequence, an up-to-date television programme schedule of a complete week will always be available. As explained in greater detail below, the receiver 3 is arranged to display the programme scheduling information for several of the channels over a predetermined period of time on the TV. Also, a viewer can interact with the receiver 3 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 13, while at the same time a second television programme in another channel is also recorded on the hard disk 13. Operation of the receiver 3 in providing simultaneous recording and playback is described in the Applicant's earlier international patent application published as WO 01/11865.

The hard disk 13 of the receiver 3 is similar to conventional hard disks used in computer systems for storing large amounts of data. The hard disk 13 has a capacity of many gigabytes (e.g. 400 gigabytes and increasing) and receives video and audio data via a SATA interface, for example, for storage in the compressed form in which it is received, for example, in accordance with the DVB/MPEG 2 standards as discussed above. This allows for the storage of several hours of television programmes (e.g. 100+ hours) on the hard disk 13. The hard disk 13 comprises two storage areas, one for the storage of television programme data, and the other for storing "metadata" which is used to control the hard disk 13, as discussed in greater detail in the Applicant's earlier patent publications mentioned above. The processor 23 controls the operation of the hard disk 13. More specifically, the processor 23 controls the recording and playback of television programmes to and from the hard disk 13. Other processors (not shown) can be used to control the hard disk 13 as appropriate, but the control is described in this document with reference to only processor 23 to facilitate understanding.

The receiver 3 also includes an external interface 35, such as a Universal Serial Bus 2 (USB2) port. The USB2 interface may be connected to a transcoding device (not shown) via a USB connector, which allows media content in a first format to be supplied from the receiver 3 and transcoded by the connected transcoding device into a second media coding format suitable for playback on a Personal Media Player (not shown). Operation of the receiver 3 in providing transcoding services is described in the Applicant's earlier international patent application published as WO 06/125999.

Remote Control Unit

Figure 2:
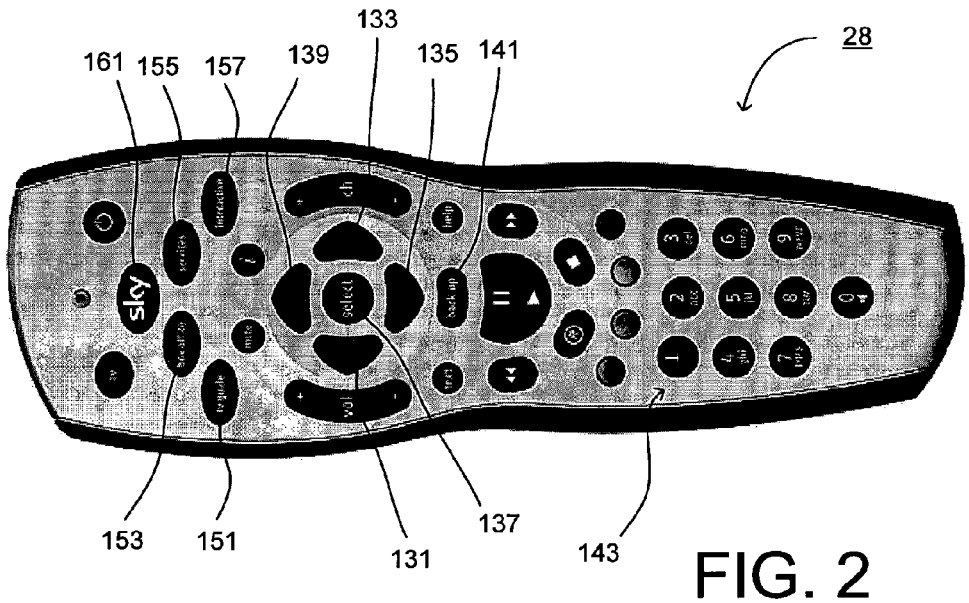
FIG. 2 is a schematic illustration of a remote control unit for use with embodiments of the present invention.

As will be described in the embodiments below, a user navigates between particular regions and menu items of an interactive user interface using appropriate button or key presses of a remote control unit 28. FIG. 2 shows an example of a remote control unit 28 for use with embodiments of the present invention. As shown in FIG. 2, the remote control unit 28 includes a dedicated IEPG button 161 for displaying or hiding the fullscreen IEPG display which is discussed in detail below. Four directional navigation buttons 131, 133, 135 and 137 are also provided on the remote control unit 28 for the user to navigate throughout the IEPG display as will be discussed below. A plurality of other buttons or keys are also provided on the remote control unit 28 and are discussed in the embodiments below as appropriate.

IEPG Display Embodiments

Embodiments of the invention include novel display features and layouts of an interactive user interface for a TV environment, which will now be described below. Those skilled in the art will appreciate that any combination of the display features and layouts described in the following embodiments and alternatives is possible.

Three-Level Menu

Figure 3:
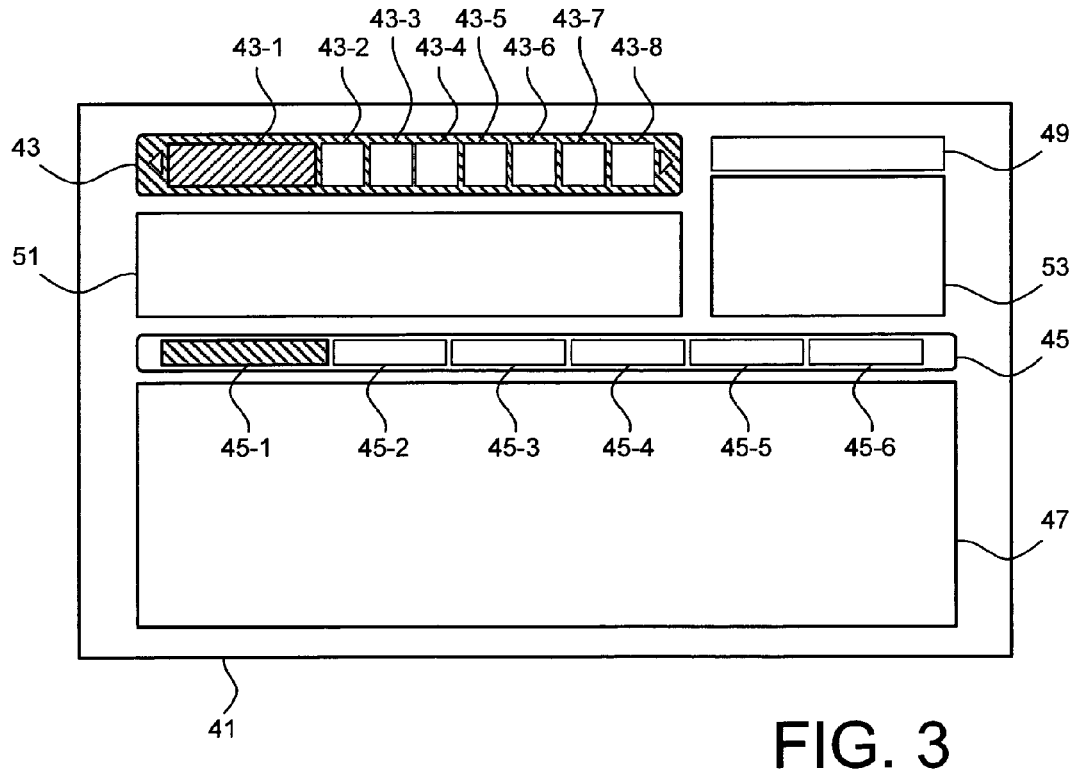
FIG. 3 is a schematic illustration of an interactive user interface according to an embodiment of the invention.

In the embodiment schematically illustrated in FIG. 3, the IEPG display 41 consists of six distinct, non-overlapping regions. There are three main regions which in this embodiment are always displayed in the IEPG display 41. The first main region is a top level menu 43 containing a plurality of top level menu items 43-1 to 43-8 corresponding to a respective plurality of sections which may be individually selected by the user. The user may navigate through the different sections by navigating through the top level menu items of the top level menu 43, as will be described in more detail below. The second main region is a secondary level menu 45 containing one or more secondary menu items 45-1 to 45-6 for each section corresponding to a respective top level menu item in the top level menu 43. The third main region is a data content region 47 containing content or data relating to a selected secondary menu item of a selected section, as indicated by the highlighted top level menu item 43-1 and the highlighted secondary level menu item 45-1.

The three main regions effectively provide a three level menu structure for the IEPG display and advantageously reduces the amount of information provided on screen to a user at one time by separating the total information available to the user into different sections. The three level menu structure also advantageously allows for the fast navigation of the large amounts of available data. The three level menu structure also advantageously provides a continuous indication to the user of the portion of information that is being displayed in the data content region 47 relative to the total information which is available to the user.

As shown in FIG. 3, the IEPG display 41 also includes three additional regions, including a current information region 49 containing the current time and date, as well as a company or brand name or logo, in this example "Sky Guide", an information region 51 for containing information or descriptive text, and a mini-TV region 53 containing a scaled-down picture from the last tuned channel or from playback of a recorded programme.

Figure 4:
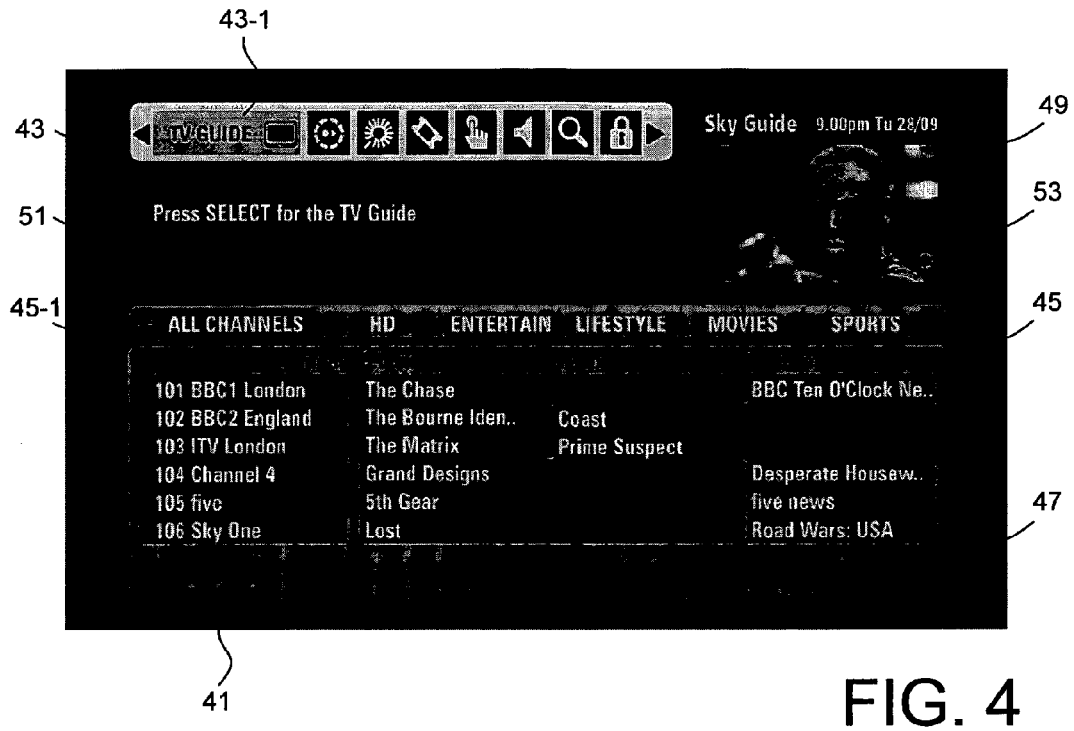
FIG. 4 is an example of an interactive user interface according to an embodiment of the invention.

FIG. 4 shows an example of a fullscreen IEPG display 41 corresponding to the schematic IEPG display 41 illustrated in FIG. 3. The top level menu 43 includes a highlighted elongated menu item 43-1 labelled "TV GUIDE" indicating to the user that the currently selected top level menu item 43-1 is associated with an EPG display screen for displaying a listing of EPG programme titles for a selection of channels over a predefined time period. The information area 51 displays an instruction to the user to press the Select button to select the highlighted menu item 43-1 which causes the EPG to be displayed, as shown in FIG. 4. In the illustrated example, programme listings in the EPG are displayed for six channels in a one and a half hour window of time.

In the example shown in FIG. 4, the top level menu 43 is displayed with a lighter background to indicate that control focus is presently on the top level menu 43. In this way, commands issued by a user via the remote control unit 28 are associated with the top level menu 43 so that the user can scroll through the top level menu items to select a particular screen. The unselected top level menu items 43-2 to 43-8 only include an icon and do not include a text label. The unselected top level menu items 43-2 to 43-8 are also displayed with a dark background to emphasise the highlighted selected top level menu item 43-1. As the user navigates between the menu items of the top level menu 43 using appropriate button or key presses, a newly selected icon expands to display a corresponding label corresponding to the display screen associated with the icon, and the information region 51 is updated with an instruction to the user to press the Select button to view that display screen. The various display screens available to the user from the top level menu 43 are discussed in detail below.

Figure 5:
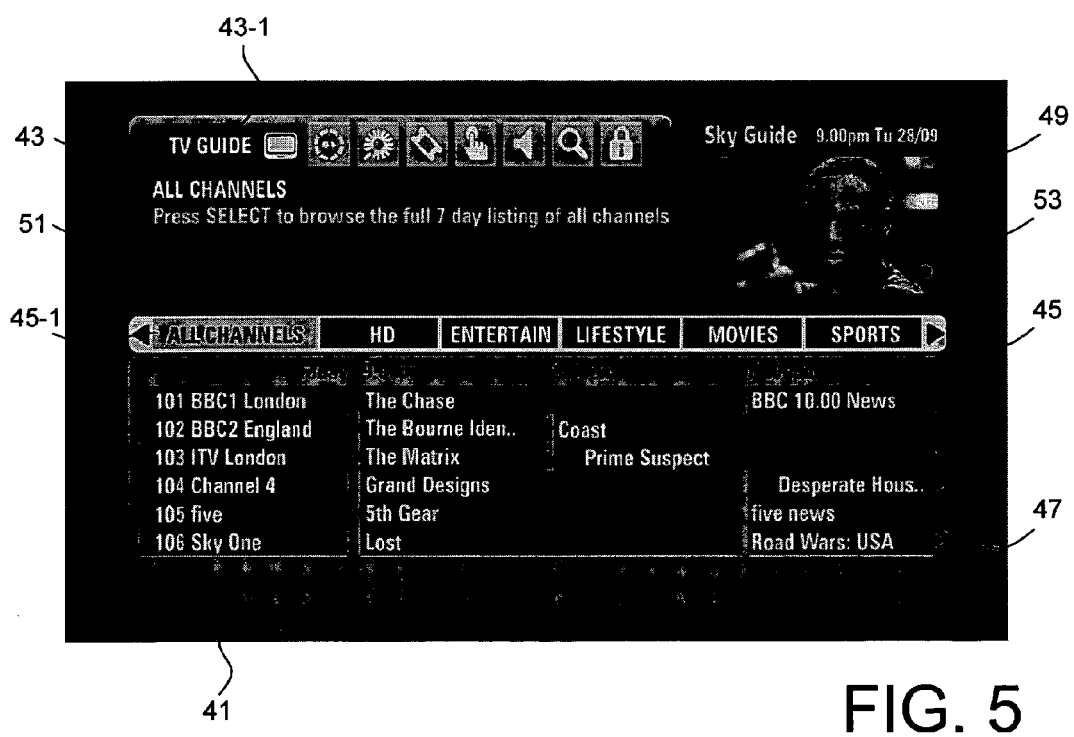
FIG. 5 is another example of the interactive user interface shown in FIG. 4.

The secondary menu 45 is displayed with a darker background to indicate that the menu is not currently selected. Conversely to the top level menu 43 which is selected in FIG. 4, the selected secondary menu item 45-1 is displayed with a dark background whereas the unselected secondary menu items 45-2 to 45-6 are displayed with a relatively lighter background to emphasise the unselected highlighted secondary menu item. As shown in FIG. 5, the user may select the secondary menu 45 using an appropriate button or key press, for example by pressing a down arrow on the remote control unit 28. In response to the user command to change to selection focus from the top level menu 43 to the secondary menu 45, the relative lighter and darker backgrounds of each menu are reversed. In the example shown in FIG. 5, the secondary menu 45 is now displayed with a lighter background to indicate that the secondary menu 45 is currently selected and the top level menu 43 is now displayed with a dark background to indicate that the top level menu 43 is not currently selected. The user may cycle through predefined collections of channels as indicated by the secondary menu items 45-1 to 45-6 displayed in the secondary menu 45 which is associated with the TV Guide section of the IEPG 41. In the example shown in FIG. 4, the "ALL CHANNELS" tab 45-1 is highlighted to indicate that the EPG will display programme listings for all available channels. The user may select the data content region 47 using an appropriate button or key press, for example by once again pressing the down arrow on the remote control unit 28. With the EPG highlighted (not shown), the user may then scroll through the rows of EPG data listings for each channel and for different times using appropriate button or key presses, for example.

Remove Mini TV

Figure 6:
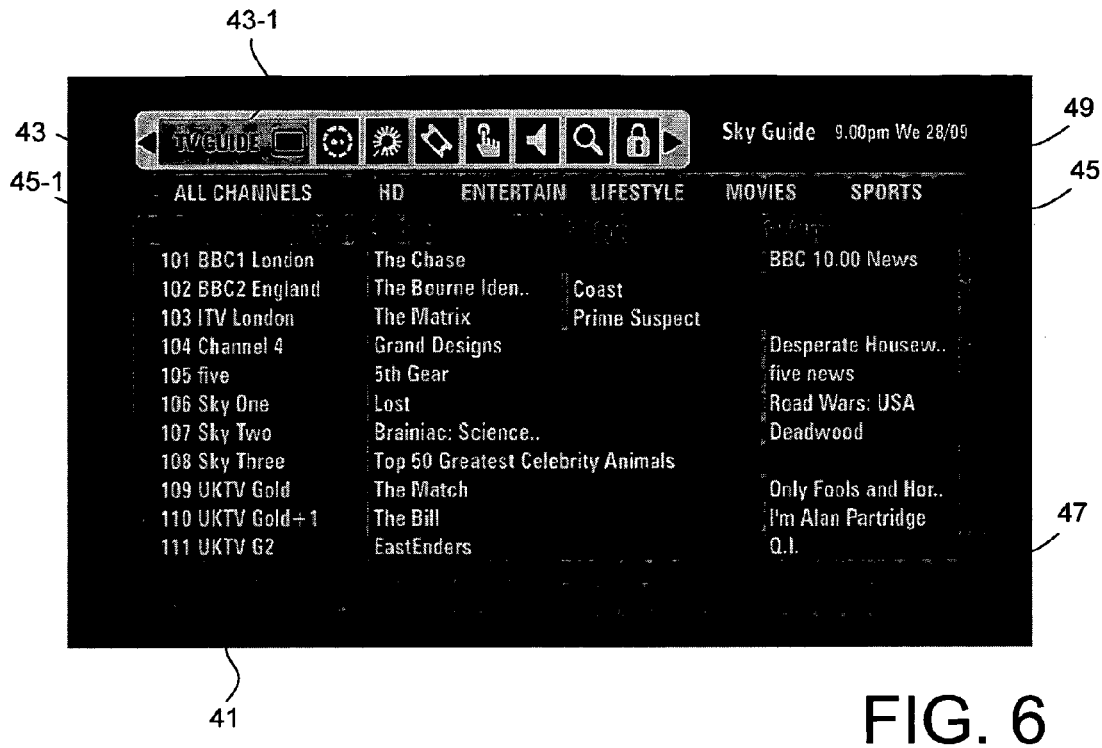
FIG. 6 is an example of the interactive user interface shown in FIG. 4 in an alternative mode.

FIG. 6 shows an example of an IEPG display 41 according to another embodiment in which the mini TV region 53 is not displayed. In the example shown in FIG. 5, the information region 51 is also not displayed. In this embodiment, the user is provided with an option to inhibit the mini TV region 53 in the MPG 41 so that more rows of EPG programme listings for more channels may be displayed in the data content region 47. For example, as shown in FIG. 6, five additional rows of programme listings can be displayed in the data content region 47 when the mini TV region 53 is not displayed. In this embodiment, when the mini TV region 53 is inhibited, the video frame data for that region is not included in the display screen generated by the on-screen display and graphics generator 22.

Figure 7:
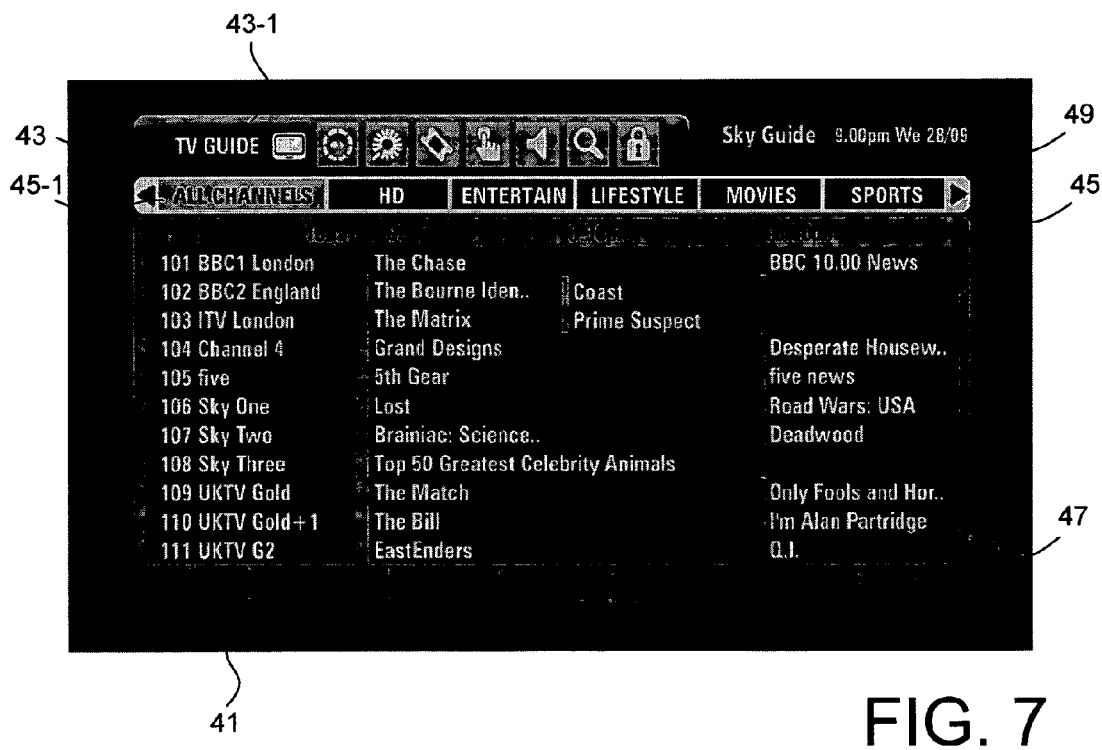
FIG. 7 is an example of the interactive user interface shown in FIG. 5 in an alternative mode.

FIG. 7 shows an example of the IEPG display 41 of FIG. 5 where the secondary menu 45 is selected but in which the mini TV region 53 is not displayed. As discussed above, in this alternative mode, additional rows of programme listings can be displayed in the data content region 47. Additionally, as information related to a highlighted programme listing is not displayed in this alternative mode, the programme information may be displayed to the user in an overlaid text box (not shown) in response to the user pressing an appropriate button or key.

The user selectable option may be provided in a customisation options screen, as will be described below. Alternatively or in addition to providing a user selectable option, the user may choose to hide or show the mini TV region 53 using an appropriate button or key press.

Series Link Popup

Figure 8:
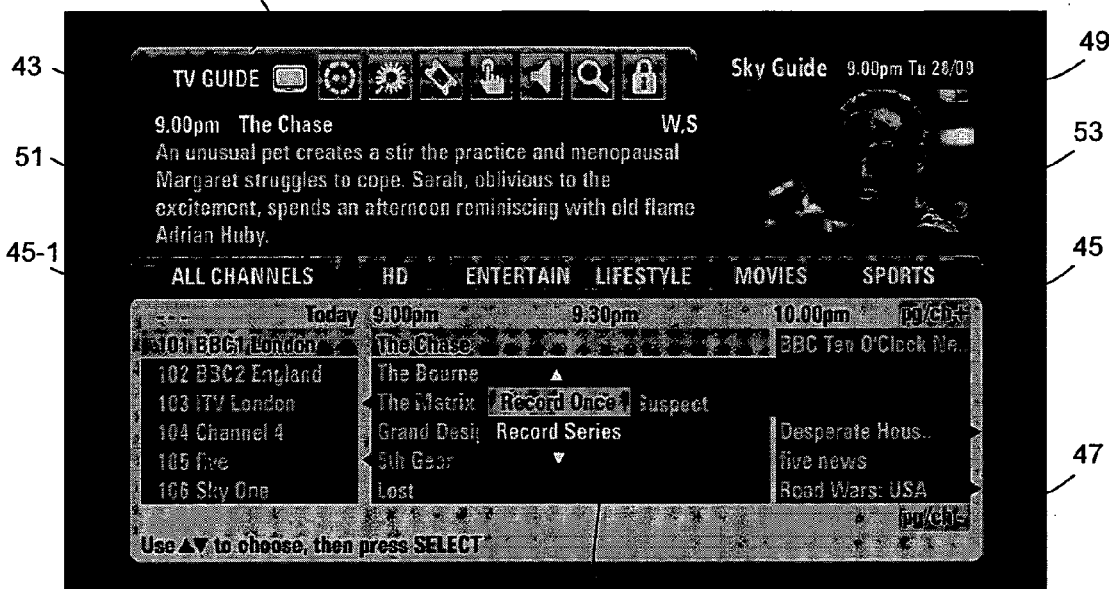
FIG. 8 is an example of an interactive user interface according to an embodiment of the invention.
Figure 9:
FIG. 9 is another example of the interactive user interface shown in FIG. 8.

FIGS. 8 and 9 show an example of an IEPG display 41 in accordance with another embodiment in which individual programmes and series' of programmes may be recorded by the user. As shown in FIG. 8, the user has selected to view all channels in the TV Guide as indicated by a highlighted secondary menu item 45-1. The EPG is displayed in the data content region 47 and is highlighted with a lighter background to indicate that control focus is currently on the data content region 47 so that a user can navigate around the EPG and issue commands with respect to the programme listings presently displayed in the highlighted data content region 47 using an appropriate button or key press. One basic command that the user can issue is to select a different programme from the EPG which is currently being shown on another channel. In this embodiment, by pressing the appropriate button to select a highlighted programme in the EPG, the receiver 3 tunes to the selected channel and displays the programme in the mini TV region 53. The selected programme is displayed in fullscreen mode after the user presses the appropriate select button again.

Another command that the user can issue is to record a selected programme. In the example shown in FIG. 8, the highlighted programme "The Chase" starting at 9 pm on BBC1 is part of a series or group of programmes. The EPG data includes information identifying this particular programme as being part of a series or group, for example a link to another program in the series. Therefore, after a user has navigated around the EPG to highlight the programme "The Chase" and pressed the appropriate button or key to record the programme, a popup menu is displayed with two options to either record the particular episode of the programme once, as shown in FIG. 8, or to record the entire series, as shown in FIG. 9. The data content region 47 also includes instructions to the user to use the up and down arrow buttons to choose a particular option for recording the highlighted programme or series from the menu, and then to press a select button to begin recording according to the selected option.

As an alternative, the popup menu may also include other options, for example providing the user an option to record both the current episode and the next episode of the programme series.

Planner

Figure 10:
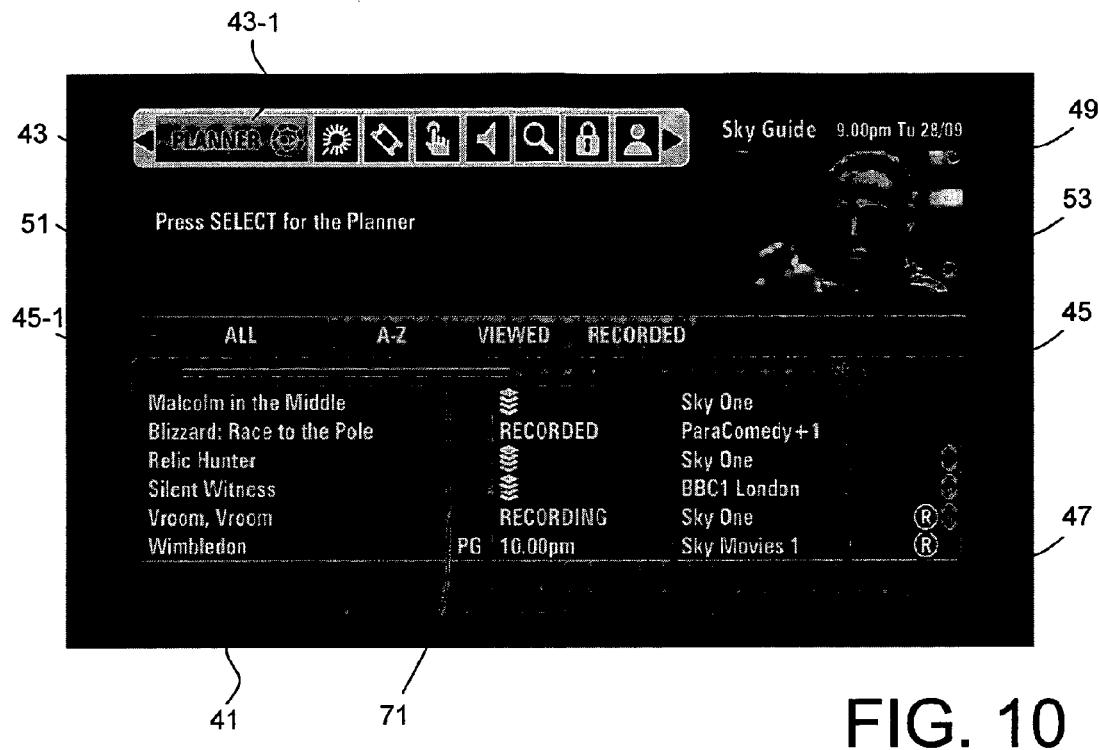
FIG. 10 is an example of an interactive user interface according to an embodiment of the invention.

FIG. 10 shows an example of an IEPG display 41 in accordance with another embodiment in which a Planner screen is displayed to a user in the data content region 47 to provide organisation and playback functionality for recorded programmes. As shown in FIG. 10, the user has scrolled through the top level menu 43 to highlight and select the planner screen, as indicated by the highlighted elongated top level menu item 43-1 which is now labelled "PLANNER". Consequently, the secondary menu 45, the data content region 47 and the information region 51 now display information corresponding to the Planner screen. In particular, the secondary menu 45 now includes four secondary menu items, which allow the user to view a listing of all already recorded programmes and programmes to be recorded in the future, to view the listing in alphabetical order, or to view a subset of the listings, in this example all recorded programmes which have already been viewed by the user or a listing of all programmes which have already been recorded. The way in which the user navigates to and throughout the secondary menu 45 is the same as described above.

As shown in FIG. 10, the listing of recorded items includes summarised programme information as a row for each recorded entity, each entity having five attributes arranged in separate columns. The attributes displayed in the display screen of FIG. 10 include, where the attribute information is available: a programme title, a viewer guidance parental rating, a recorded/recording/to be recorded status or showing time, a channel name and icons for further aspects of the programme such as a subtitle indicator, a high definition indicator, a Dolby Digital indicator, an audio description indicator, a copy protection indicator, a Dolby Stereo indicator and a widescreen format indicator. Each entity in the listing may be a single TV programme (such as "Blizzard: Race to the Pole"), a movie (such as "Wimbledon"), or a series of programmes or movies (such as "Malcolm In the Middle"). In this embodiment, the listings for programmes with the same title are effectively collapsed into a single listing element as indicated by an icon 71 of a stack in the third column of the EPG. Additionally, a series of programmes with the same title may be collapsed for a particular channel so that different channels may have different collapsed entries. For example, the series "Eastenders" which may be shown on the two channels "UK Gold" and "BBC 1" may have separate collapsed entries in the programme listing (not shown), with the corresponding channel name indicated in the fourth column. Operation of the receiver 3 in providing this collapsible UI aspect is described in the Applicant's earlier GB patent application No. 0625811.5.

Figure 11:
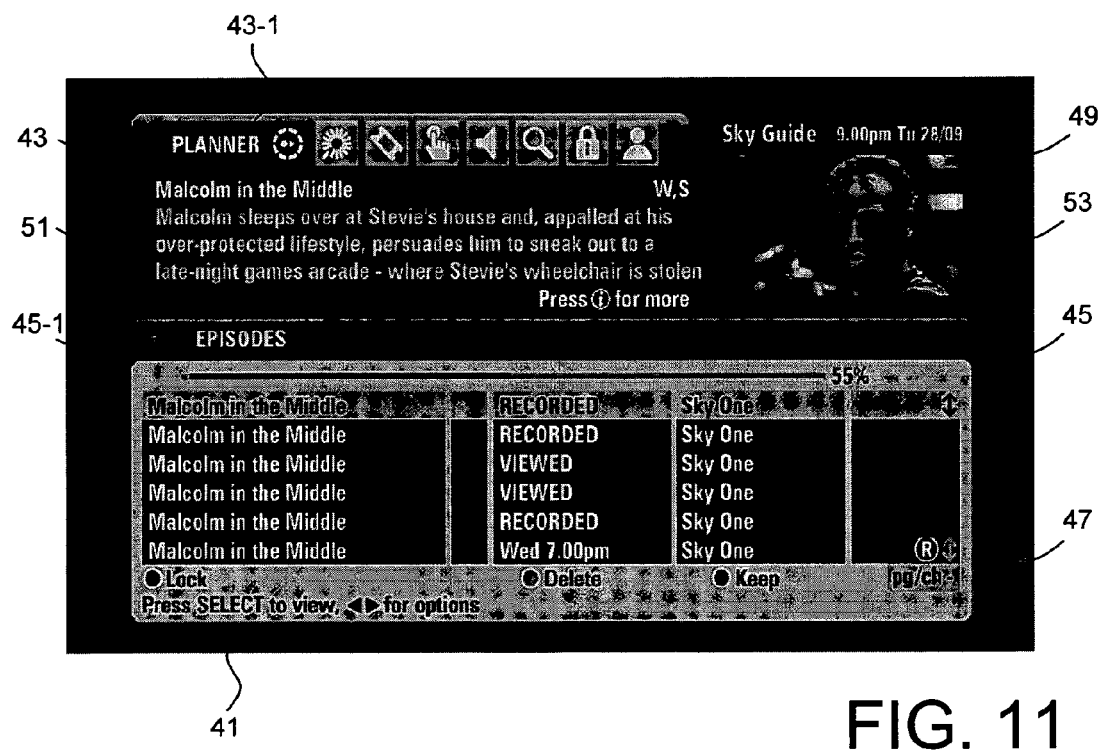
FIG. 11 is another example of the interactive user interface shown in FIG. 10.

FIG. 11 shows the Planner screen of this embodiment after the user has highlighted and selected the programme series "Malcolm In The Middle" recorded from the channel "Sky One". As shown in FIG. 11, the secondary menu now includes just a single secondary menu item labelled "Episodes" and the data content region 47 includes a listing of the individual episodes of the programme series. FIG. 11 shows one of the already recorded episodes highlighted in the data content region 47 and a corresponding programme synopsis for that episode displayed in the information region 51. The information region 51 also includes a prompt for the user to press a particular button or key on the remote control unit 28 to retrieve and display further information regarding the episode and/or programme series. The user may also scroll through the individual episodes displayed in the listing using appropriate button or key presses, for example. As the user highlights a particular episode, the corresponding programme synopsis is automatically displayed in the information region 51. The user can then select to view the highlighted programme by pressing an appropriate button or key, such as a "play" button on the remote control unit 28. In this embodiment, when playback of the selected programme is initiated, the video data is displayed in the mini TV region 53. Pressing the same button or key again will switch the IEPG display 41 off so that the selected programme is displayed in fullscreen mode. Additionally, in this embodiment, when playback of the selected programme is being displayed in the mini TV region 53 of the Planner display screen, the user may control playback of the selected programme using appropriate button or key presses, for example to fast forward, pause or rewind playback of the media content. However, when the user navigates away from the Planner display screen, for example by selecting a top level menu item associated with a different display screen, the mini TV region 53 continues to display playback of the selected programme but user control of the playback is disabled.

The data content region 47 shown in FIG. 11 also includes a number of instruction prompts for the user to organize and maintain the list of recorded and to be recorded programmes. As shown in FIG. 11, the user may choose to delete or keep a highlighted episode in the listing, or to lock a highlighted episode so that the particular programme cannot be inadvertently deleted. As programmes are recorded and deleted, the amount of free space available on the hard disk 13 of the receiver 3 is adjusted and is displayed in the data content region 47. In the example display screens shown in FIGS. 10 and 11, the amount of free space currently available is indicated as 55% of total amount of hard disk space allocated for storing recorded programmes.

Alternatively, a recycle bin functionality may be provided for deleted planner entries. In such an alternative, a highlighted programme may be deleted and therefore removed from the listing of recorded episodes. However, the deleted entry may simply be moved to a recycle bin listing which may be accessible via the secondary menu 45 (not shown). In this alternative, the user may therefore maintain an organized listing of recorded and to be recorded programmes by deleting unwanted entries, for example, if an episode has already been viewed. However, the recorded data is not deleted from the hard disk until the recycled bin is emptied by the user, for example when the hard disk is full. In this way, entries moved to the recycle list may be recovered by the user if an entry was inadvertently marked as deleted.

Figure 12:
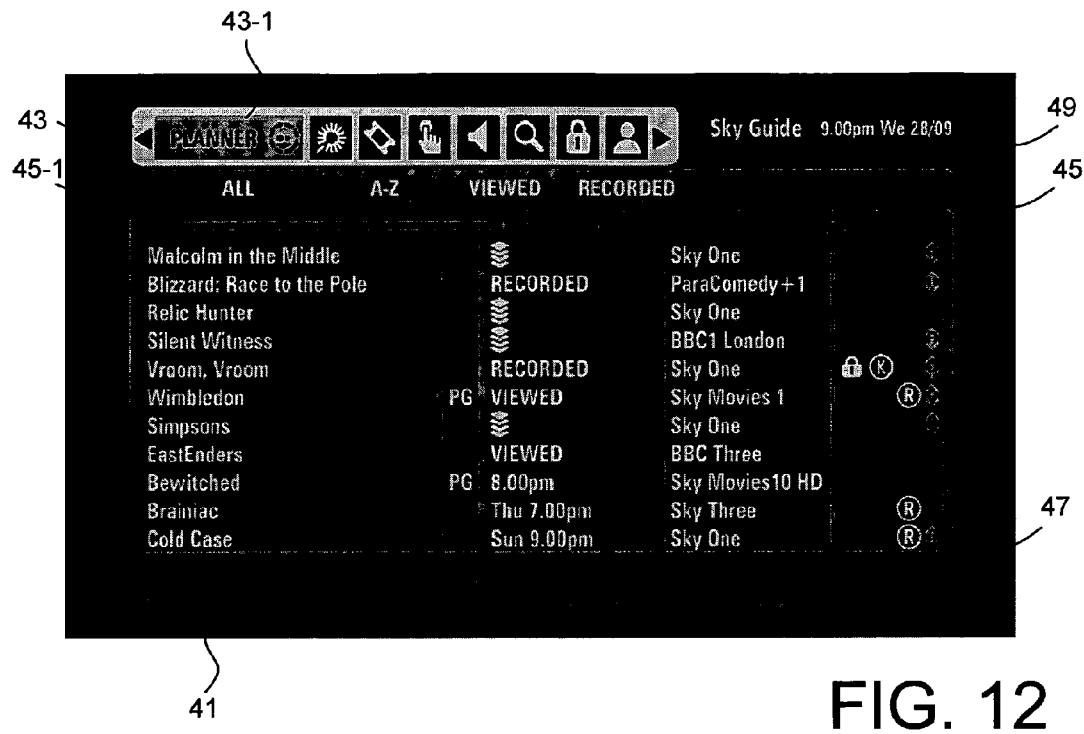
FIG. 12 is an example of the interactive user interface shown in FIG. 10 in an alternative mode.

FIG. 12 shows an example of the IEPG display 41 of FIG. 10 in the alternative mode where the mini TV region 53 and the information region 51 are not displayed, as discussed above. In this alternative mode, five further rows of information are displayed in the data content region 47.

Radio Guide

Figure 13:
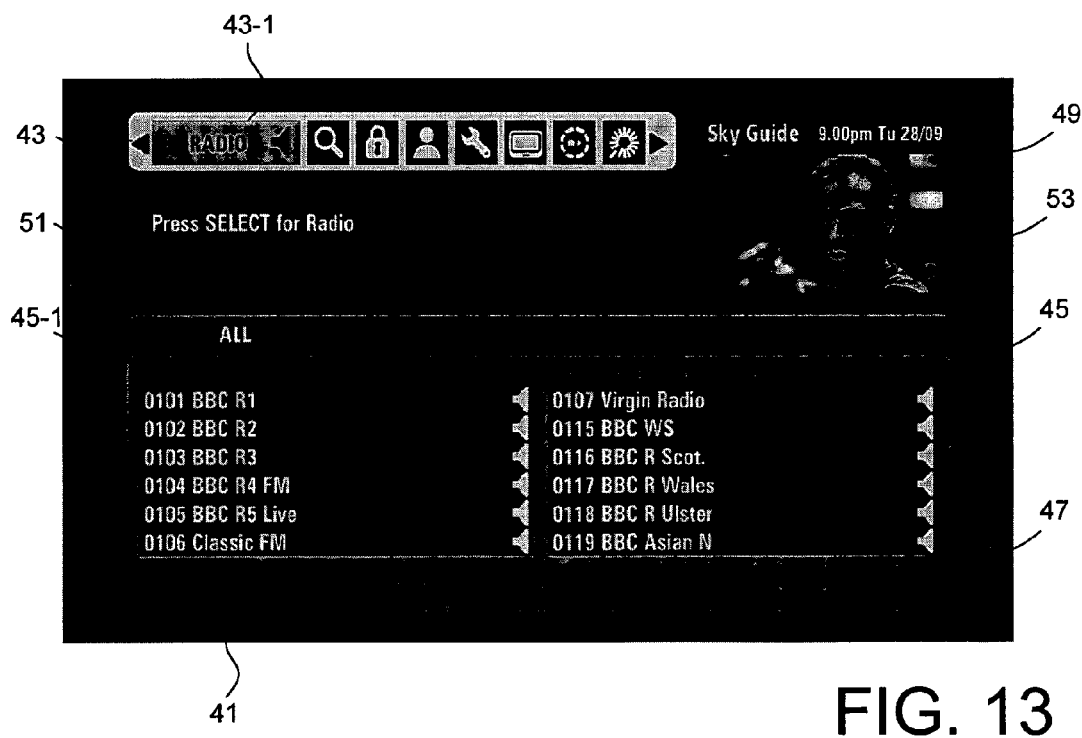
FIG. 13 is an example of an interactive user interface according to an embodiment of the invention.

FIG. 13 shows an example of an IEPG display 41 in accordance with another embodiment in which a Radio Guide screen is displayed to a user in the data content region 47 to provide selection of a particular digital Radio station. As shown in FIG. 13, the user has scrolled through the top level menu 43 to highlight and select the Radio Guide screen, as indicated by the highlighted elongated top level menu item 43-1 which is now labelled "RADIO". Consequently, the secondary menu 45, the data content region 47 and the information region 51 now display information corresponding to the Radio Guide screen. In particular, the secondary menu 45 now includes just a single secondary menu item, to indicate that all of the available radio stations are being displayed in the data content region 47. In this embodiment, the plurality of available radio stations are displayed in channel number numerical order in two columns in the data content region 47. As shown in FIG. 13, the mini TV region 53 is presently showing a scaled-down picture from the last tuned channel and will display a radio icon once the user has selected a particular channel. In this way, a separate IEPG screen is provided to the user for only listing the available digital radio stations.

Figure 14:
FIG. 14 is an example of the interactive user interface shown in FIG. 13 in an alternative mode.

FIG. 14 shows an example of the IEPG display 41 of FIG. 13 in the alternative mode where the mini TV region 53 and the information region 51 are not displayed, as discussed above. In this alternative mode, five further rows of radio stations are displayed in each column of the data content region 47.

Search with Multiple Criteria

Figure 15:
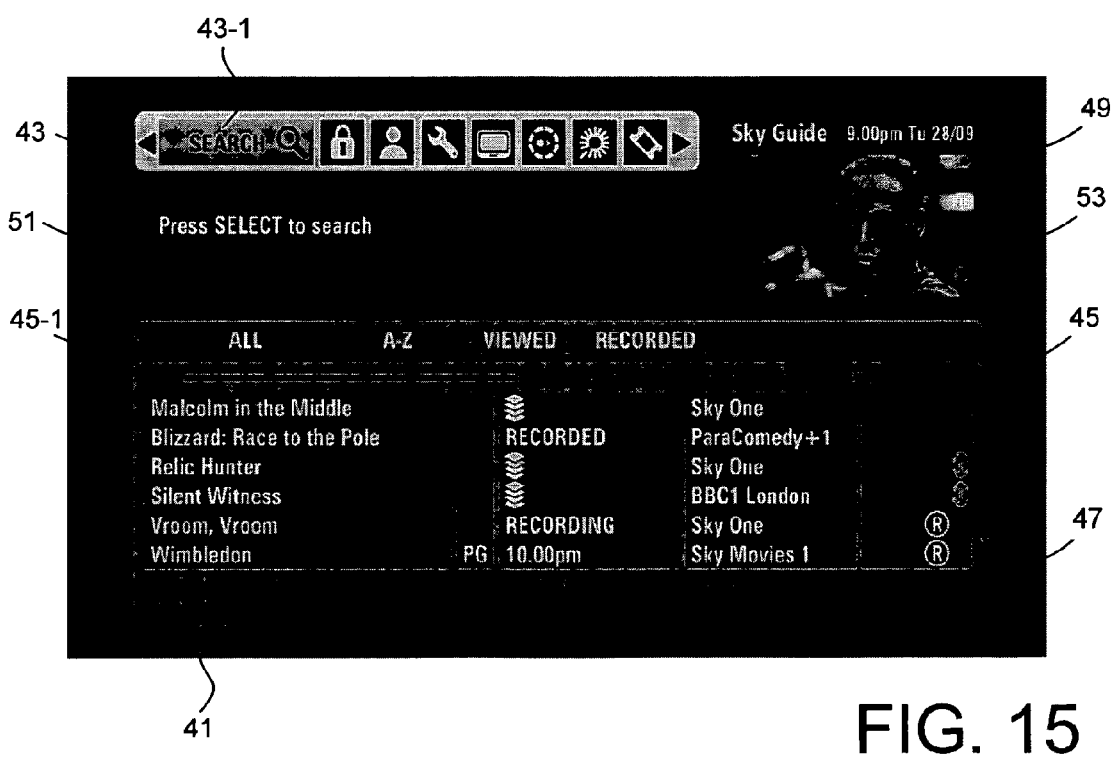
FIG. 15 is an example of an interactive user interface according to an embodiment of the invention.
Figure 16:
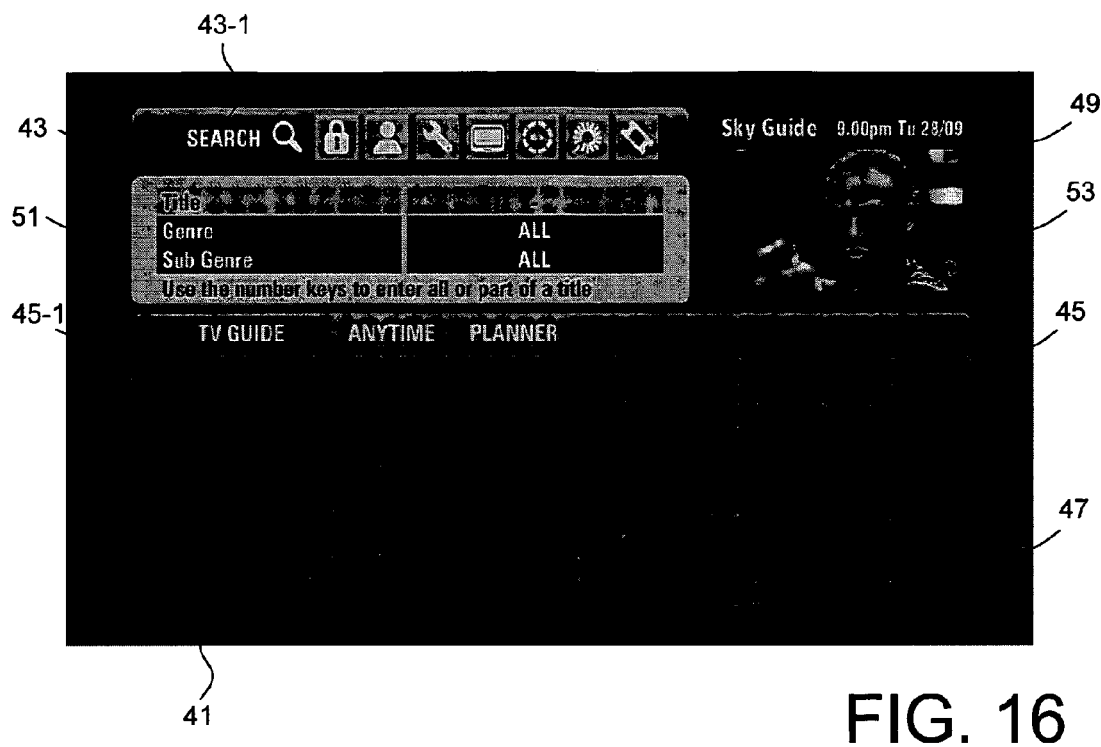
FIG. 16 is another example of the interactive user interface shown in FIG. 15.
Figure 17:
FIG. 17 is another example of the interactive user interface shown in FIG. 16.

FIGS. 15 to 17 show an example of an IEPG display 41 in accordance with another embodiment in which a Search screen is displayed to a user in the data content region 47 to provide for search functionality within the EPG programme data. As shown in FIG. 15, the user has scrolled through the top level menu 43 to highlight and select the Search top level menu item, as indicated by the highlighted elongated top level menu item 43-1 which is now labelled "SEARCH". In the example screen shown in FIG. 15, the user has not yet pressed the select button to select the Search screen and consequently, the secondary menu 45, the data content region 47 and the information region 51 are displaying information corresponding to a previously selected screen, in this case the Planner screen. When the user presses the appropriate button to select the Search screen, the secondary menu 45, the data content region 47 and the information region 51 are updated to display information corresponding to the Search screen, as shown in FIG. 16. In particular, the information region 51 now displays search criteria input options, and the data content region 47 is cleared to display search results. The secondary menu 45 now includes three secondary menu items, which allow the user to view a listing of all search results matching the input criteria from the TV Guide programme data, from the Video on Demand programme data, or from the Planner recorded programme data. The way in which the user navigates to and throughout the secondary menu 45 is the same as described above.

As shown in FIG. 17, a user may perform a search by submitting a search request with search criteria specified in the information region 51 of the Search screen. In this embodiment, the user is provided with three search criteria input options. A first field 51-1 is provided in the information region 51 for the user to input a number of characters, for example up to a maximum of ten characters, to create a Title search criteria. For example, the user can input a combination of letters, numbers and/or punctuation to create a Title search criteria. In the example shown in FIG. 17, the user has entered the characters "FR" into the Title criteria input field to perform a search for all programme titles beginning with the input characters. In a second field 51-3 of the information region 51, the user can select a particular genre from a list of available genres. By default, the genre field is set to "ALL" to perform a search over all genres of programmes. In a third field of the information region 51, the user can select a particular sub-genre from a list of available sub-genres, provided that a genre has been previously selected in the second field of search criteria input options. The user can then press an appropriate button or key to confirm that all search criteria have been added and to initiate a search for all programme entries matching the input search criteria.

As those skilled in the art will appreciate, the input search criteria are optional and a user may submit a search without specifying any search criteria, for example, by leaving the title input field blank and the genre search criterion as "ALL" genres and sub-genres. In this case, the search would return a list of all available programme titles.

Figure 18:
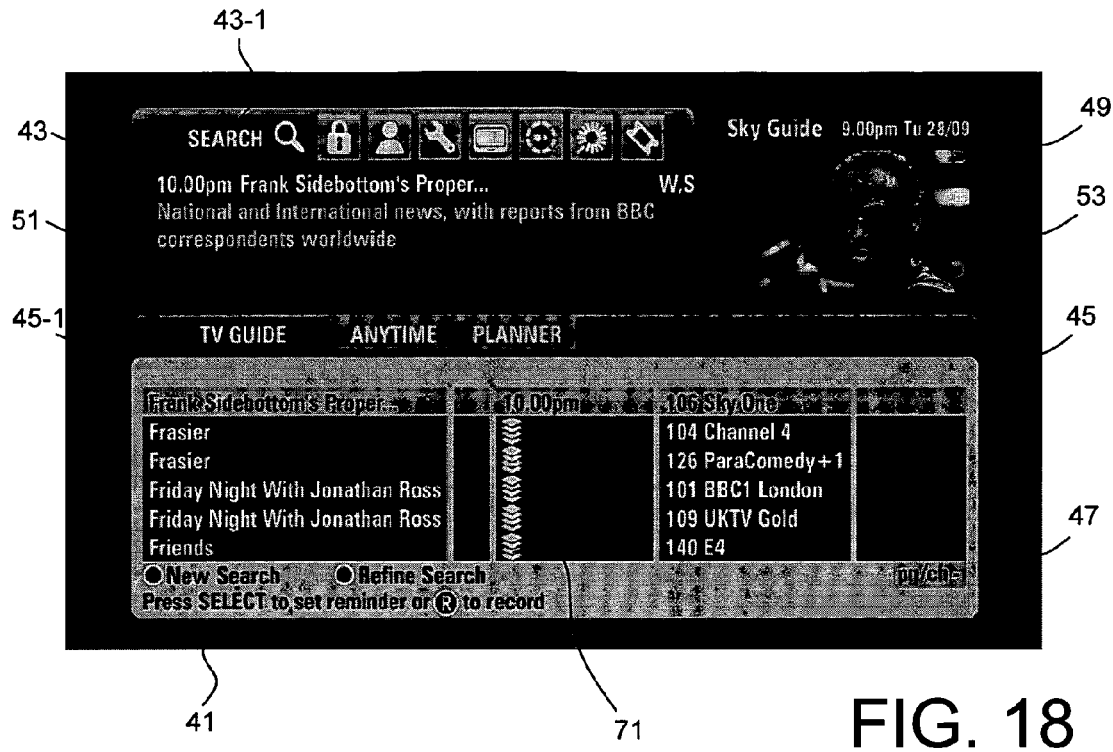
FIG. 18 is another example of the interactive user interface shown in FIG. 17.

Once the search has been performed, the search results are displayed in the data content region 47 with the first search result highlighted and the corresponding programme synopsis displayed in the information region 51 in place of the search input criteria, as shown in FIG. 18. In the example shown in FIG. 18, the search has been performed for all programmes in the TV Guide EPG data which begin with the characters "FR". The search results displayed in the data content region 47 list the first six programmes from the TV Guide EPG data that begin with the letters "FR", with a first programme "Frank Sidebottom's Proper . . . " showing on Sky One at 10.00 pm being highlighted. The summarised programme information displayed in the search results screen includes all of the available programme attribute information as discussed above. The user can select to tune to the channel of a search result programme which is currently showing, or to initiate play back of a recorded programme from the hard disk 13. The user is also provided with an instruction to set a reminder for the highlighted programme which is not currently showing or to record the highlighted programme by pressing the appropriate button or key. Additionally, search results with the same title are collapsed to a single search result entry per channel in the data content region 47 and displayed with a corresponding stack icon 71, as discussed above. The user may then navigate to and expand a selected collapsed group of programmes, in a similar manner as discussed above.

From the search results screen as shown in FIG. 18, the user can navigate back to the search criteria input screen shown in FIG. 17 to refine the input search criteria, by pressing an appropriate button or key. Additionally, as discussed above, the user can navigate to the secondary menu 45 to select an alternative source category, such as "Anytime" for Video on Demand or "Planner" for recorded programmes. By selecting a different secondary menu item from the secondary menu 45, the user can request a search within that category of EPG data using the most recent input search criteria. Alternatively, the user may request a new search by pressing an appropriate button or key to display a new Search screen with the title field empty and the genre and sub-genre fields set to "ALL".

In an embodiment, the system is arranged to inform the user that the search is in progress if the search results have not been returned within a predetermined amount of time, for example two seconds after the user has pressed the appropriate button to initiate the search. Furthermore, the user may interrupt and terminate a search in progress by pressing an appropriate button or key.

In an embodiment, where the search results include a plurality of programmes with the same name and start time but being shown on different channels, for example, regional channel variations, the system will only return a single search result for that particular programme, for example the programme being shown on the regional channel variant with the lowest logical channel number.

Separate User Customisation

Figure 19:
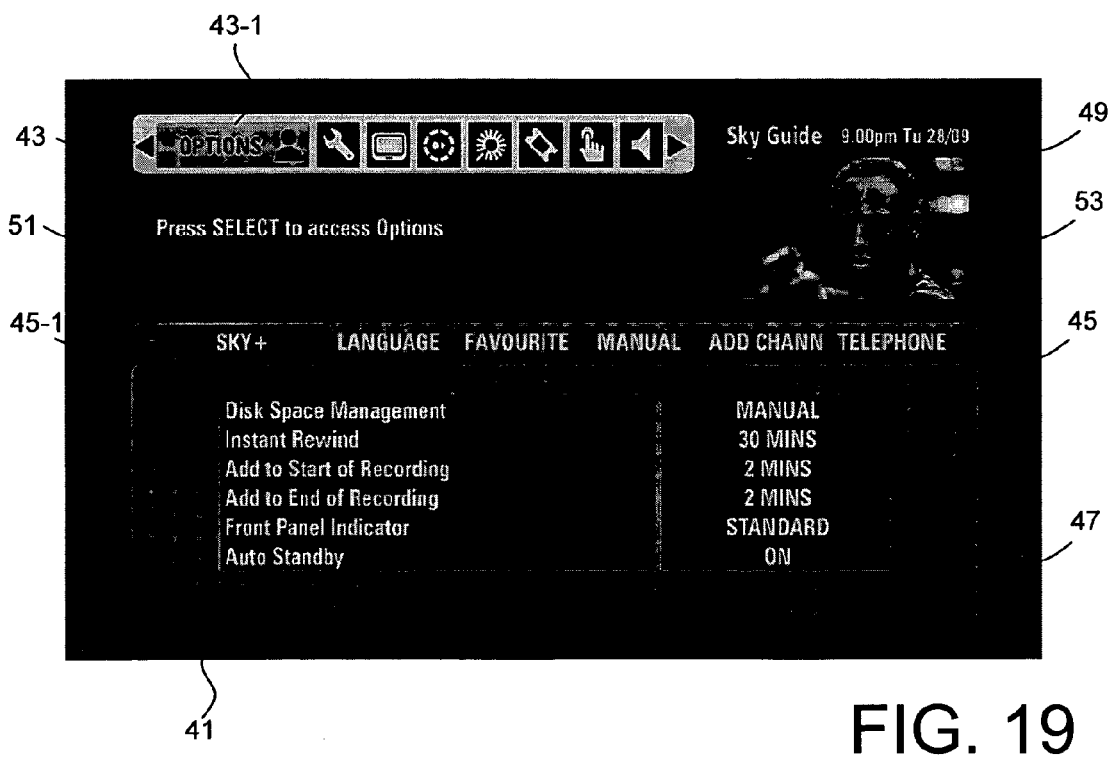
FIG. 19 is an example of an interactive user interface according to an embodiment of the invention.
Figure 20:
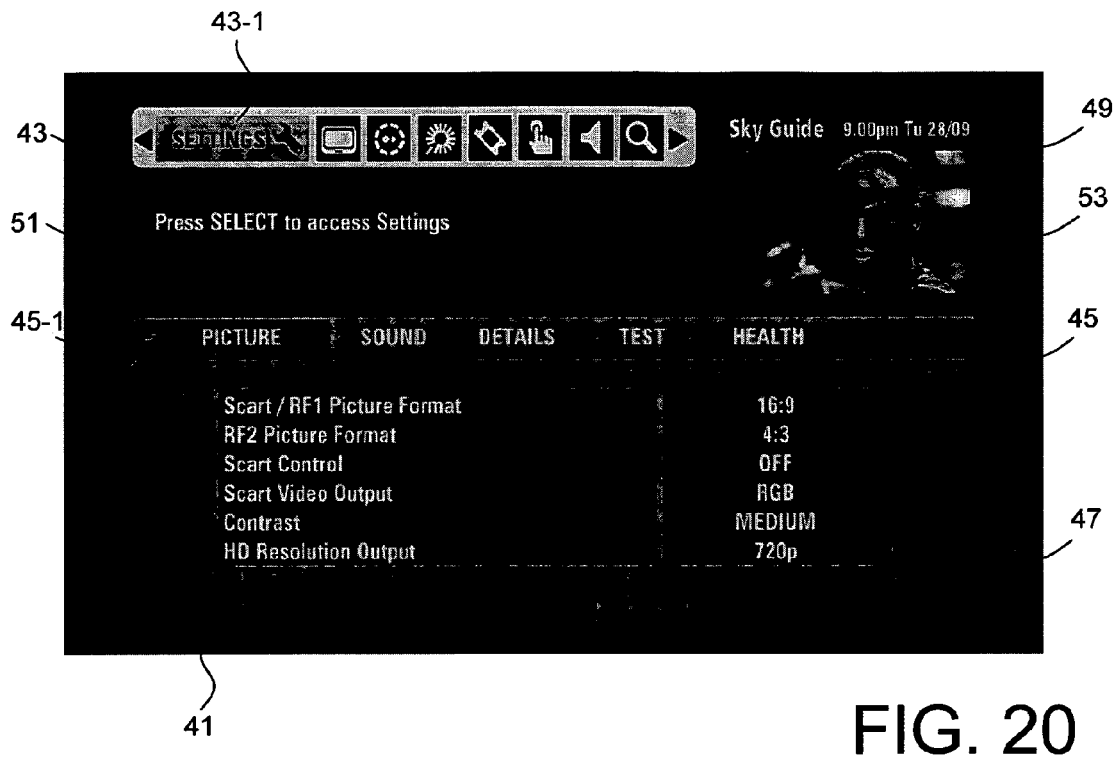
FIG. 20 is an example of an interactive user interface according to an embodiment of the invention.

FIGS. 19 and 20 show examples of an IEPG display 41 in accordance with another embodiment in which two separate user customisation screens are displayed to a user in the data content region 47 to provide for separation of user-friendly customisation options from user-unfriendly technical settings. As shown in FIG. 19, the user has scrolled through the top level menu 43 to highlight and select the Options top level menu item, as indicated by the highlighted elongated top level menu item 43-1 which is now labelled "OPTIONS". The secondary menu 45 now includes seven secondary menu items, six of which are shown in FIG. 19, which allow the user to view and change a plurality of user-friendly customisation options arranged into groups of related options. The way in which the user navigates to and throughout the secondary menu 45 is the same as described above.

In the example shown in FIG. 19, the groups of user-friendly customisation options include:

Group: Sky+ Set up
Options: Disk space management
Time before Instant rewind
Time to add to start of recording
Time to add to end of recording
Front panel indicator
Auto Standby
Group: Language and Subtitles
Options: Subtitles
Audio description
Favourite language
Highlighted programmes
Beep on Audio description
Group: Favourite Channels
Options: List of all channels
Group: Manual Recording
Options: Manual record screen
Group: Add Channels/Other Channels
Options: Manual tuning screen together with list of "Other Channels"
Group: Telephone Numbers
Options: List of telephone numbers
Group: Sky Guide Options
Options: Mini TV region on or off by default
On screen icon timeout
Search and Scan Banner (discussed below) Time out
Highlight true High Definition programmes
Enable Anytime (Video on Demand) TV
Message Alert
Beep on error As shown in FIG. 20, the user has scrolled through the top level menu 43 to highlight and select the Settings top level menu item, as indicated by the highlighted elongated top level menu item 43-1 which is now labelled "SETTINGS". The secondary menu 45 now includes five secondary menu items which allow the user to view and change a plurality of user-unfriendly technical settings arranged into groups of related options. The way in which the user navigates to and throughout the secondary menu 45 is the same as described above.

In the example shown in FIG. 20, the groups of user-unfriendly technical settings include:
Group: Picture Settings
Options: SCART/RF1 Picture format
RF2 Picture Format
SCART Control
SCART Video Output
Contrast
HD Resolution output
Group: Sound Settings
Options: Audio Output Volume
Optical Output
Optical Output delay
Group: System Details
Options: Manufacturer
Model number
Version number
Serial number
Viewing card number
Operating system version
EPG software version
Group: Test
Options: Perform signal test
Group: System Health Check
Options: Perform system health check A hidden installer menu may also be provided as an additional secondary menu item accessible by pressing a predefined combination of buttons or keys, for example. The installer menu may provide further settings such as LNB setup, default transponder, telephone settings, RF Outlets, manual tuning, new installation, Sky+ Planner rebuild and full system reset. As those skilled in the art will appreciate, the hidden menu includes settings which are not used regularly by a typical user.

The above customisation options and settings are provided merely as examples of the types of options and settings that may be provided to a user. As those skilled in the art will appreciate, different settings may be provided and the grouping and separation of options and settings may vary depending on which options and settings are predetermined to be user-friendly options and user-unfriendly settings.

Further Functionality

FIGS. 21 to 27 show further examples of IEPG displays 41 in which additional functionality may be provided to a user. Each additional screen is provided with a corresponding top level menu item in the top level menu 43, as described below.

Figure 21:
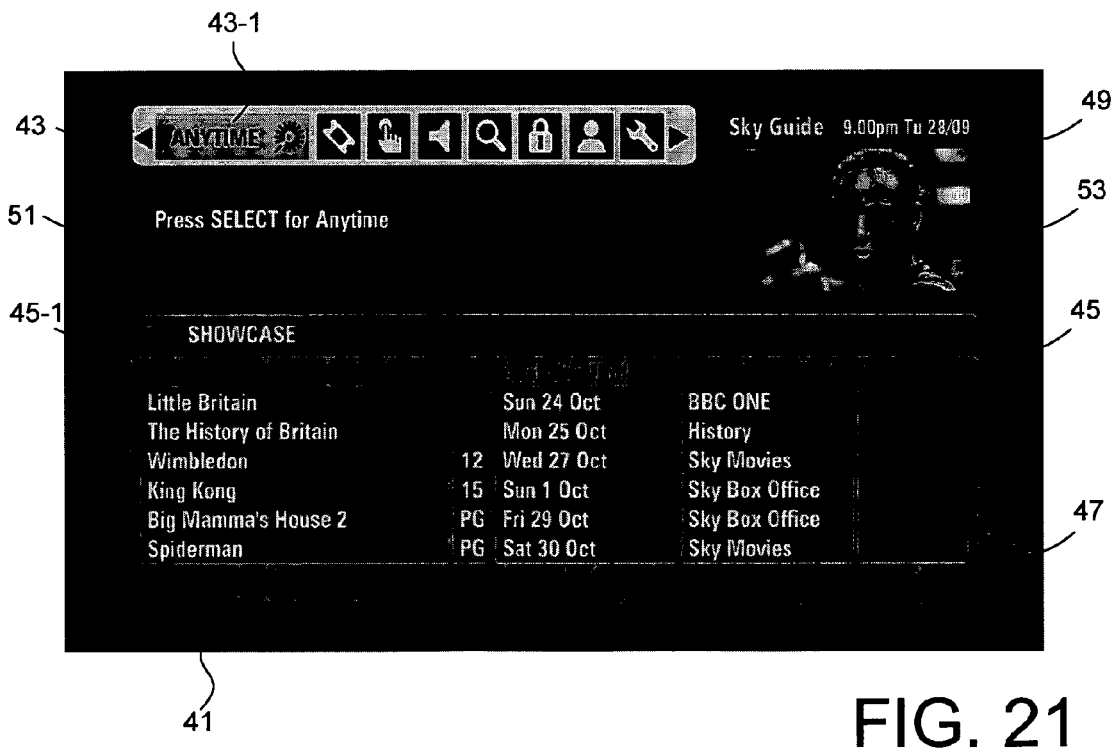
FIG. 21 is an example of an interactive user interface according to an embodiment of the invention.
Figure 22:
FIG. 22 is an example of the interactive user interface shown in FIG. 21 in an alternative mode.

FIG. 21 shows an example of an IEPG display 41 in which a push video on demand (VOD) screen is displayed to a user in the data content region 47 to provide selection of a particular programme or movie from a list of available media content stored on the receiver 3. As shown in FIG. 21, the user has scrolled through the top level menu 43 to highlight and select the push VOD screen, indicated by the highlighted elongated top level menu item 43-1 which is now labelled "ANYTIME". Consequently, the secondary menu 45, the data content region 47 and the information region 51 now display information corresponding to the push VOD screen. In particular, the secondary menu 45 now includes just a single secondary menu item, to indicate that all of the available push VOD media content is being displayed in the data content region 47. The information region 51 and the data content region 47 display summarised programme information for the available media content in a similar manner as discussed above for the TV Guide and the Planner screens, except that the third column lists a date of availability of the push VOD media content, after which the media content item will be deleted from the receiver 3. As shown in FIG. 21, the mini TV region 53 is presently showing a scaled-down picture from the last tuned channel and will display the selected media content once the user has made a selection. FIG. 22 shows an example of the IEPG display 41 of FIG. 21 in the alternative mode where the mini TV region 53 and the information region 51 are not displayed, as discussed above. In this alternative mode, five further rows of media content are displayed in the data content region 47. As those skilled in the art will appreciate, the example IPEG display 41 shown in FIG. 21 could also be used to display selected pull VOD content items to the user in the data content region 47.

Figure 23:
FIG. 23 is an example of an interactive user interface according to an embodiment of the invention.
Figure 24:
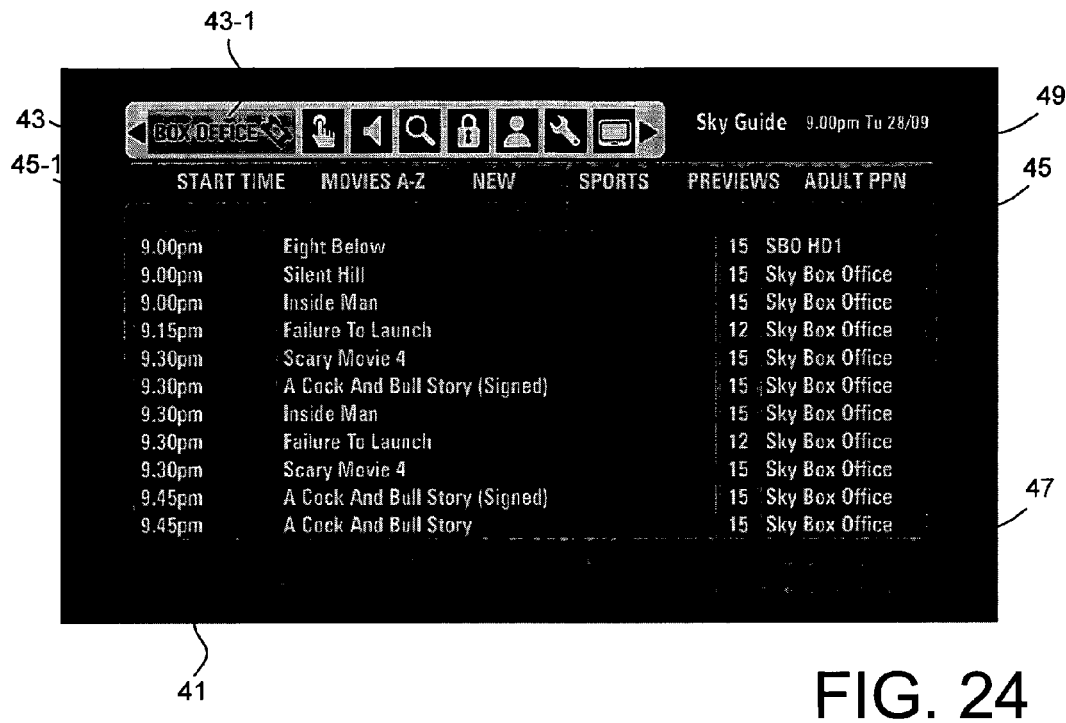
FIG. 24 is an example of the interactive user interface shown in FIG. 23 in an alternative mode.

FIG. 23 shows an example of an IEPG display 41 in which a Pay Per View (PPV)/Near Video On Demand (NVOD) screen is displayed to a user in the data content region 47 to provide selection of a particular programme or movie from a list of media content available from a NVOD content provider. NVOD media content is provided by a content provider at particular scheduled transmission times, typically on respective different NVOD channels. For example, in the NVOD screen shown in FIG. 23, six different movies are listed, each with a respective starting time and channel. NVOD media content, such as movies, are generally broadcast on a plurality of channels at predetermined time intervals. Some PPV media content, such as televised sporting events, may only be broadcast once at a specific time. As shown in FIG. 23, the user has scrolled through the top level menu 43 to highlight and select the NVOD screen, indicated by the highlighted elongated top level menu item 43-1 which is now labelled "BOX OFFICE". Consequently, the secondary menu 45, the data content region 47 and the information region 51 now display information corresponding to the NVOD screen. In particular, the secondary menu 45 now includes six secondary menu items, which allow the user to view a listing of all movies ordered by start time, to view the listing of all movies in alphabetical order, to view a subset of all the new movie listings, to view a listing of all sports related NVOD media content, to view a listing of previews of available NVOD media content, or to view a listing of adult-rated NVOD media content. The way in which the user navigates to and throughout the secondary menu 45 is the same as described above. The information region 51 and the data content region 47 display summarised programme information for the available NVOD media content in a similar manner as discussed above for the TV Guide and the Planner screens, except that the first column is provided for listing the start time of each programme or movie, and the fifth column of further attributes is not displayed. Accordingly, although not shown in FIG. 23, the information region 51 displays a synopsis of a highlighted programme or movie in the data content region 47. The user may also toggle between display of the synopsis and a marketing message, such as cost information for ordering a selected media content item, in the information region 51 by pressing an appropriate button on the remote control unit 28, such as an information button. In this way, additional information related to a highlighted media content item is easily accessible by the user. As shown in FIG. 23, the mini TV region 53 is presently showing a scaled-down picture from the last tuned channel and will display the selected media content once the user has made a selection. FIG. 24 shows an example of the IEPG display 41 of FIG. 23 in the alternative mode where the mini TV region 53 and the information region 51 are not displayed, as discussed above. In this alternative mode, five further rows of media content are displayed in the data content region 47.

Figure 25:
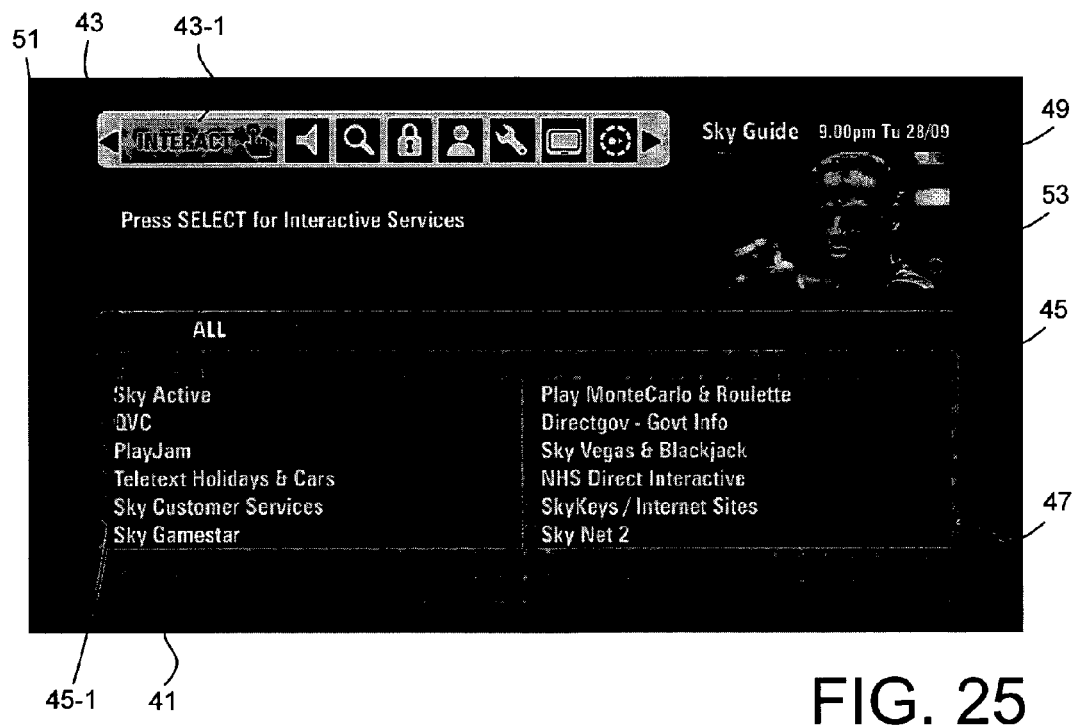
FIG. 25 is an example of an interactive user interface according to an embodiment of the invention.
Figure 26:
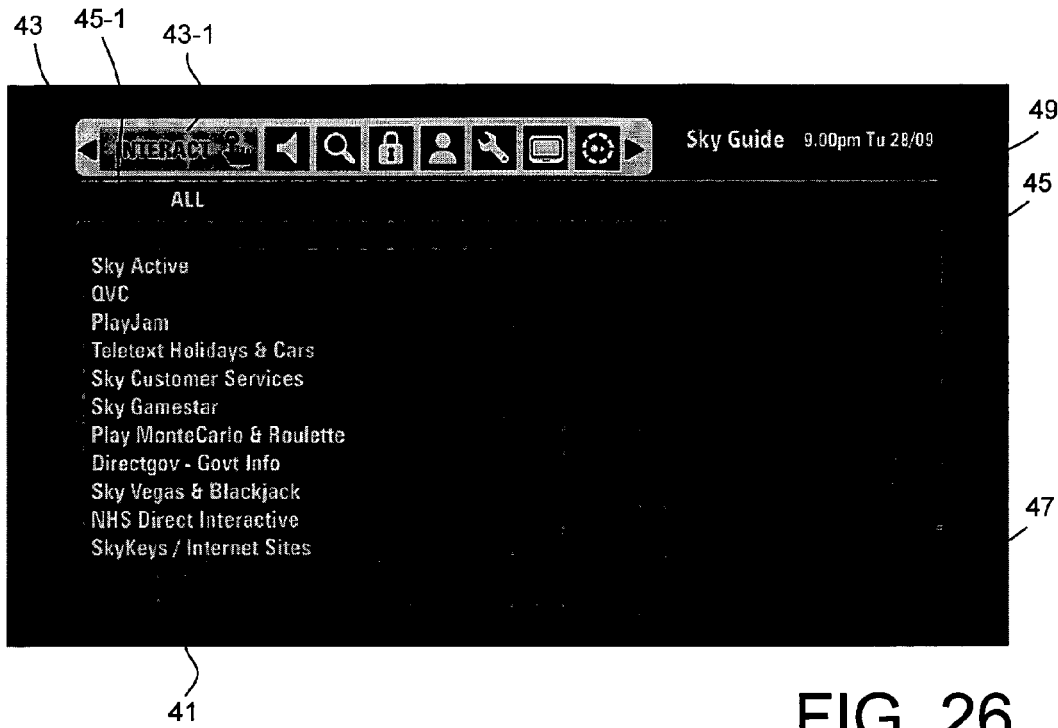
FIG. 26 is an example of the interactive user interface shown in FIG. 25 in an alternative mode.

FIG. 25 shows an example of an IEPG display 41 in which an interactive services screen is displayed to a user in the data content region 47 to provide selection of particular interactive services available to the user. As shown in FIG. 25, the user has scrolled through the top level menu 43 to highlight and select the interactive services screen, indicated by the highlighted elongated top level menu item 43-1 which is now labelled "INTERACT". Consequently, the secondary menu 45, the data content region 47 and the information region 51 now display information corresponding to the interactive services screen. In particular, the secondary menu 45 now includes just a single secondary menu item, to indicate that all of the available interactive services are being displayed in the data content region 47. The information region 51 displays a description of a highlighted interactive service displayed in the data content region 47. As shown in FIG. 25, the mini TV region 53 is presently showing a scaled-down picture from the last tuned channel and will display the selected interactive service once the user has made a selection. FIG. 26 shows an example of the IEPG display 41 of FIG. 25 in the alternative mode where the mini TV region 53 and the information region 51 are not displayed, as discussed above. In this alternative mode, five further rows of media content are displayed in the data content region 47 and the listing is arranged in a single column.

Figure 27:
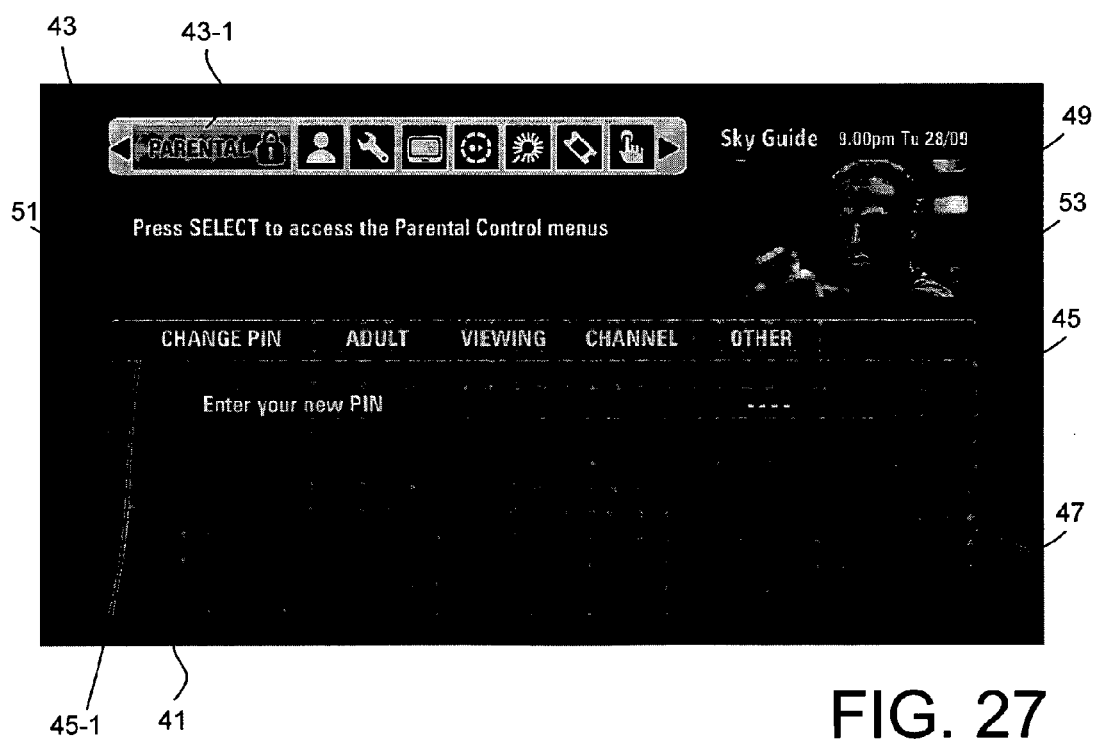
FIG. 27 is an example of an interactive user interface according to an embodiment of the invention.

FIG. 27 shows an example of an IEPG display 41 in which a parental controls screen is displayed to a user in the data content region 47 to provide a separate screen for user control of viewer restrictions. As shown in FIG. 27, the user has scrolled through the top level menu 43 to highlight and select the parental controls screen, indicated by the highlighted elongated top level menu item 43-1 which is now labelled "PARENTAL". Consequently, the secondary menu 45, the data content region 47 and the information region 51 now display information corresponding to the interactive services screen. In particular, the secondary menu 45 now includes five secondary menu items, for the user to change a PIN number for restricting access to portions of the IEPG, set adult channels, set viewing restrictions, set channel restrictions, or set other restrictions. The information region 51 displays a description of a highlighted parental control displayed in the data content region 47.

IEPG Navigation

In the embodiments described above, a user navigates between particular regions and menu items using appropriate button or key presses of a remote control unit 28, such as the one shown in FIG. 2. For example, when control focus is on the top level menu 43, the user may navigate between menu items of the top level menu 43 by pressing the left 131 or right 133 directional arrow buttons on the remote control unit 28. The user may navigate from the top level menu 43 to the secondary menu 45 by pressing either the down directional arrow button 135 or the Select button 137 on the remote control unit 28. With the secondary menu 45 selected, the system may respond to a user pressing either the up directional arrow button 139 or a Backup key 141 on the remote control unit 28 to select and change the control focus back to the top level menu 43. In a similar manner, the user may navigate between menu items in the secondary menu 45, and between the secondary menu 45 and the rows of information displayed in the data content region 47. In this way, a plurality of buttons on the remote control unit 28 may be provided to allow the user to scroll and navigate between the three menu levels with greater flexibility.

As an alternative, some or all of the menu items in the top level menu 43 and the secondary menu 45 may be associated with a particular button on the remote control unit 28. For example, the remote control unit 28 shown in FIG. 2 includes a "tv guide" button 151 to display the TV Guide display screen, a "box office" button 153 to display the pull VOD display screen, a "services" button 155 to display the user-friendly customisation options display screen, and an "interactive" button 157 to display the interactive services display screen. As a further alternative, some or all of the menu items in the top level menu 43 and the secondary menu 45 may be associated with a different, number key or sequence of number keys from a number key pad 143 provided on the remote control unit 28. In this way, a user may navigate to a desired display screen by pressing the appropriate button or the corresponding number key or sequence of number keys. These alternatives also advantageously make it easier for call centre scripting where a user requires technical assistance, for example via a telephone call to a technical support call centre, as directions may be issued to navigate to particular screens directly using a specific sequence of button or key presses. As yet another alternative, the user may be presented with an option in the customisation options screen to enable or disable the display of numbers on screen adjacent the associated menu items and/or to display particular menu items in a colour corresponding to a colour button on the remote control unit 28.

As shown in FIG. 2, the remote control unit 28 also includes a dedicated IEPG button 161 for displaying or hiding the fullscreen IEPG display 41. The remote control unit 28 also includes a "play" button 163 for controlling playback of recorded or VOD media content as discussed above. The "play" button 163 may also be used to directly access the Planner display screen when the IEPG display 41 is not currently displayed. The user may advantageously jump directly to the listing of recorded programmes, with the last watched programme highlighted, or the first programme on the list highlighted if the last watched programme has been deleted.

The receiver 3 may also be configured to determine when a key or button of the remote control unit 28, such as a directional arrow button, is being held down, for example, when scrolling through the menu items of the top level menu 43 or the secondary menu 45, or through the rows of information displayed in the data content region 47 in any of the display screens. In this case, as the control focus or the highlighted selection is switched from entity to entity, the speed of the switching is increased the longer the button is being held down, effectively increasing the scrolling speed within the IEPG display 41 while a navigational command button is being held down.

Search and Scan Banner

Figure 28:
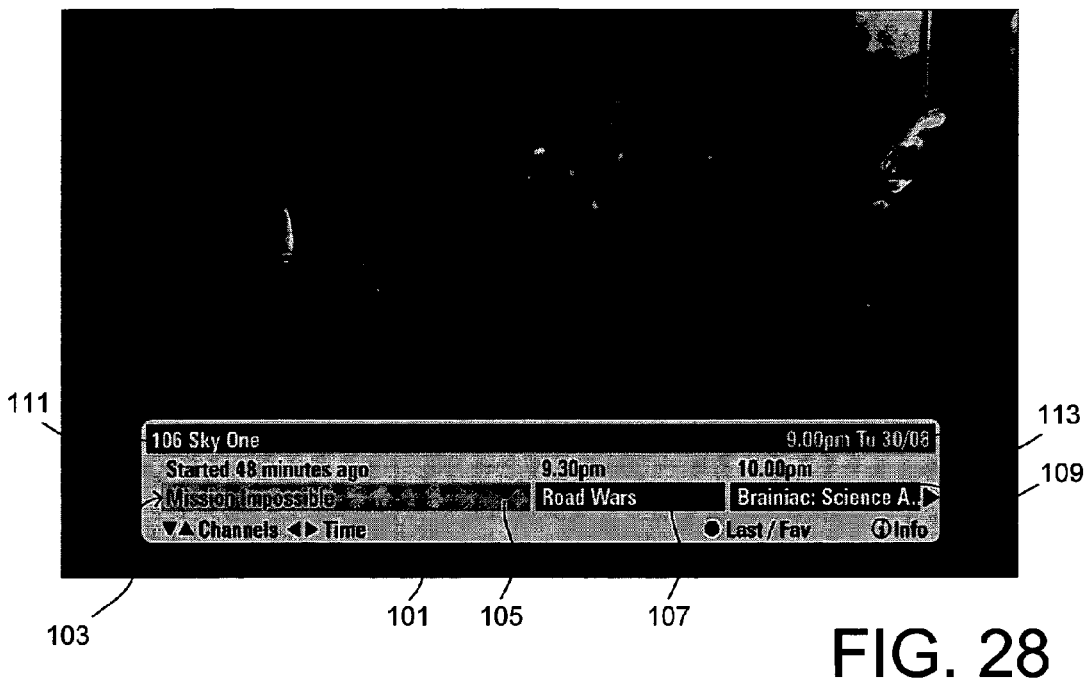
FIG. 28 is an example of an interactive user interface according to an embodiment of the invention.
Figure 29:
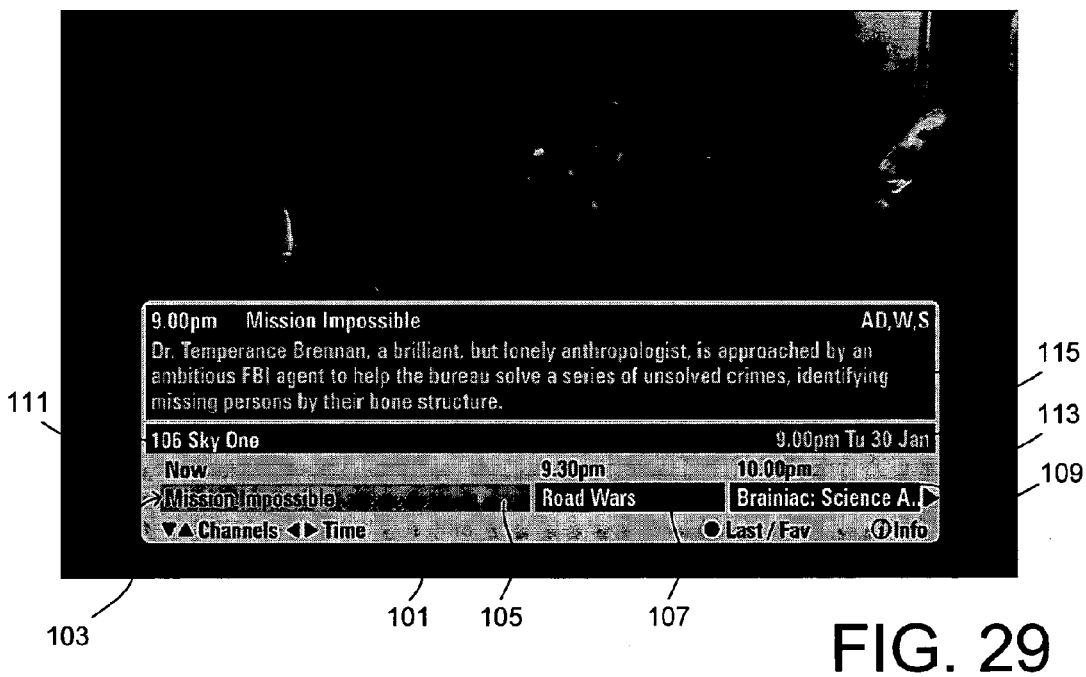
FIG. 29 is another example of the interactive user interface shown in FIG. 28.
Figure 30:
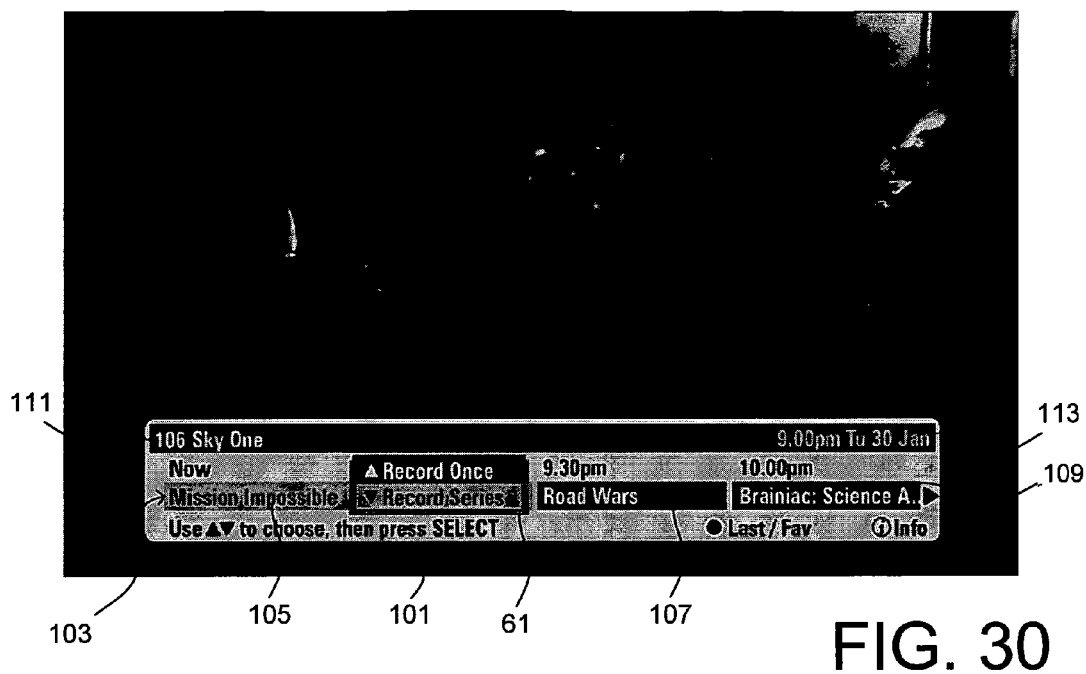
FIG. 30 is another example of the interactive user interface shown in FIG. 29.

The above embodiments describe aspects of a fullscreen IEPG in which the picture from the last tuned channel is reduced in size and displayed in mini TV region of the IEPG, or hidden completely if the mini TV region is turned off. FIGS. 28 to 30 show an additional embodiment of the IEPG operating in a banner mode which is displayed over the fullscreen picture of the last tuned channel. As shown in FIG. 28, the MPG banner 101 consists of a grid 103 displaying the current programme 105 and two subsequent programmes 107 and 109, together with the start times of the two subsequent programmes 107 and 109. In this embodiment, the column width for the highlighted programme "Mission Impossible" is greater than the column width for the other programmes, so that current selection is emphasised and in this example, the full title is visible in the expanded field. As the user navigates around the grid, the selected entry is always displayed with an expanded field.

The IEPG banner 101 also displays additional information, such as the current channel 111, the current time and date 113, and a number of options available to the user, such as navigation options for scrolling through EPG listings vertically by channel or horizontally in time. By pressing appropriate left and right direction buttons or keys, for example, the user may scroll horizontally through the programme listings for a particular channel in the X-direction of the grid 103. The receiver 3 may be configured to increase the scrolling speed within the IPEG banner 101 depending on the duration of time that a button or key is pressed, as discussed above.

Additionally, using an appropriate button or key press, the user may toggle between the current channel and a list of favourite channels set in the customisation options screen discussed above, with the last viewed channel being placed at the top of the list. In this way, the user may navigate through EPG programme listings of only those channels which have been set as favourite channels.

The IEPG banner 101 may also display the time elapsed since the current programme started.

As shown in FIG. 29, a programme synopsis may be displayed in an additional description region 115 using an appropriate button or key press. In this embodiment, as the user navigates to a different programme or channel, the corresponding programme synopsis will automatically be displayed in the description region 115.

As shown in FIG. 30, a series link popup menu may be displayed to the user using an appropriate button or key press so that individual programmes and series' of programmes may be recorded by the user, in the same way as discussed above in relation to FIGS. 8 and 9.

Further Alternative Embodiments

The embodiments described above are illustrative of rather than limiting to the present invention. Alternative embodiments apparent on reading the above description may nevertheless fall within the scope of the invention.

In the embodiments described above, specific examples are provided of the various separate display screens of the IEPG. As those skilled in the art will appreciate, many specific details of the illustrated screens are provided merely by way of example. For example, secondary menu items are sometimes provided to allow the user to select a predefined ordering for the particular listing. Although specific ordering options are described, it will be apparent that many other additional or alternative ordering options are possible. As another example, the summarised programme information discussed above includes a predetermined set of information relating to a particular media item. It will be appreciated that the amount of information that is displayed to the user for each media item may be varied and more or less information may be displayed in each listing. The amount of information displayed may also vary depending on the particular display screen.

In the embodiments described above, the example display screens are shown at a predetermined screen resolution. Accordingly, the number of items displayed in the top level menu and the secondary menu is predetermined, as well as the width and height dimensions of the various regions and fields of the display screen. As those skilled in the art will appreciate, the screen resolution will depend on the screen size and capabilities of the TV, which typically support a 4:3 aspect ratio and/or a widescreen 16:9 aspect ratio. As an alternative, the user may set an appropriate aspect ratio setting in the customisation options screen and the on-screen display and graphics generator may be arranged to change the IEPG layout according to the aspect ratio setting. For example, the layout of the IEPG as discussed in the above embodiments may be changed to display more or fewer items in the top level menu and the secondary menu, and the width of each of the regions of the display screen may be adjusted in accordance with the aspect ratio setting. As another example, the window of time displayed in the EPG of the TV Guide screen may be extended to allow for more programme entities to be displayed depending on the available display size.

In some of the embodiments described above, the IEPG is provided as a fullscreen interactive user interface where the displayed user interface substantially fills the full display area of the TV. As those skilled in the art will appreciate, the fullscreen IEPG display screens described above may include a border or edge areas, for example where the TV display area has a different size or aspect ratio. Furthermore, additional information, graphics or video may be superimposed or overlaid on the fullscreen interactive user interface.

The above embodiments are presented as separate embodiments but those skilled in the art will appreciate that any combination of the display screens and aspects therein described in the above embodiments and alternatives is possible.

The invention claimed is:

1. A method of providing an interactive user interface for a television display, the method comprising:
providing at least three continuously displayed non-overlapping regions of the interactive user interface in a display space, wherein the non-overlapping regions provide an electronic program guide for selection of program material by a user, the non-overlapping regions comprising:
a first region having a plurality of top level menu items each associated with a respective section of the electronic program guide, wherein the top level menu items become selectable in response to selection of the first region;
a second region having at least one second level menu item in response to selection of a top level menu item, each second level menu item associated with a respective sub-section of the electronic program guide relating to the selected first level menu item, and wherein each second level menu item becomes selectable in response to selection of the second region; and
a third region having at least one data content item in response to selection of a second level menu item, each data content item providing data content relating to the selected first and second level menu items, wherein each data content item becomes selectable in response to selection of the third region;
outputting, to the television display, the display space identifying at least: a currently selected one of said regions, a currently selected one of the menu items of the currently selected region, and a currently selected one of the menu items of a non-selected region;
receiving a region select command from a remote control unit to select a different region, and in response, selecting said different region, and updating the display space; and
receiving a navigation command from the remote control unit to select a menu or data content item adjacent to the currently selected one of the menu items of the currently selected region, and in response:
determining the currently selected region;
if it is determined that the second region is currently selected, then selecting the adjacent menu item of the second region, and updating the third region with the at least one data content item relating to the currently selected second level menu item;
if it is determined that the third region is currently selected, then selecting the adjacent data content item of the third region; and
updating the display space.

2. A method according to claim 1, wherein at least two different user commands are provided to perform the same navigation selection of a different region.

3. A method according to claim 1, wherein one of said plurality of top level menu items is associated with a planner screen providing a list of user-selectable entities in the third region, each representing a recorded viewable content item, wherein:
in response to a user command to play back a selected entity, the recorded viewable content item is displayed in a video data display region and user play back control is enabled; and
in response to a user command to select a different top level menu item, play back of the recorded viewable content continues in the video data display region but user play back control is disabled.

4. A method according to claim 1, wherein one of said plurality of top level menu items is associated with a radio guide display section providing a list in the third region consisting of available digital radio stations.

5. A method according to claim 1, wherein one of said plurality of top level menu items is associated with a video on demand display section providing a list of user-selectable media content in the third region, wherein in response to a user command to display information associated with the selected media content item, an information display region alternates between displaying a synopsis of the selected media content item and a marketing message associated with the selected media content item.

6. A method according to claim 1, wherein at least some of said regions and menu items are selectable by a numerical input command.

7. A method according to claim 1, the method further comprising receiving programme scheduling data including title data, genre data and sub-genre data for a plurality of programmes, and wherein one of said plurality top level menu items is associated with a search display screen including user input fields for specifying search criteria including a genre, a sub-genre and characters from a programme title, wherein a search is conducted for programmes in the received programme scheduling data matching the user input search criteria.

8. A method according to claim 7, wherein the sub-genre user input field is only available as a search criteria when a genre search criteria is specified.

9. A method according to claim 7, wherein the search is conducted to identify programmes in the received programme scheduling data with title data beginning with characters matching the user input characters from a programme title search criteria.

10. A method according to claim 1, the method further comprising receiving a continuous command from a user to navigate through information displayed in a display screen and increasing a navigation speed in dependence upon the length of time of said continuous command.

11. A method according to claim 1, the method further comprising receiving programme scheduling data for a plurality of channels, and providing another display space for display over image data of a currently viewed programme, wherein the another display space displays information associated with one channel from a first list of user navigatable available channels, and wherein in response to a user command, the display space switches between displaying information associated with the first list and information associated with a second list of navigatable channels, the second list of navigatable channels including a last tuned channel and a list of user-defined favourite channels.

12. A method according to claim 1, wherein the television display has an associated aspect ratio, and wherein the method further comprises providing a display space having a layout for a first aspect ratio and providing a display space having a different layout for a second aspect ratio.

13. A method according to claim 12, wherein the first aspect ratio is 4:3 and wherein the second aspect ratio is 16:9.

14. A method according to claim 1, wherein unselected top level menu items are represented with an icon and no text description, and wherein a selected top level menu item is expanded and represented with an icon and text description in response to a navigation command.

15. A method according to claim 1, the method further comprising receiving programme scheduling data including title information associated with a currently viewed programme and at least two subsequent programmes to be broadcast after the currently viewed programme, and providing another display space for display over image data of a currently viewed programme, wherein the another display space displays the title information of the currently viewed programme and subsequent programmes as a row of user-selectable entities, wherein the entity for a currently selected entity is displayed with a larger width.

16. The method of claim 1, further comprising displaying a selected region with a first highlight and displaying a selected menu item of the selected region with a second highlight different to the first highlight.

17. A receiver apparatus comprising:
an input receiver that receives user control signals from a remote control; and
a processor configured to respond to the received user control signals and to generate video and graphics data for an interactive user interface in a television environment, such that the generated video and graphics data provides at least three continuously displayed non-overlapping regions of the interactive user interface in a display space of the television environment,
wherein the non-overlapping regions provide an electronic program guide for selection of program material by a user, the non-overlapping regions comprising:
a first region having a plurality of top level menu items each associated with a respective section of the electronic program guide, wherein the top level menu items become selectable in response to selection of the first region;
a second region having at least one second level menu item in response to selection of a to level menu item, the or each second level menu item associated with a respective sub-section of the electronic program guide relating to the selected first level menu item, and wherein the or each second level menu item becomes selectable in response to selection of the second region;
a third region having at least one data content item in response to selection of a second level menu item, the or each data content item providing data content relating to the selected first and second level menu items, wherein the or each data content item becomes selectable in response to selection of the third region;
the processor further configured to:
output, to the television display, the display space identifying at least; a currently selected one of said regions, a currently selected one of the menu items of the currently selected region, and a currently selected one of the menu items of a non-selected region;
receiving a region select command from a remote control unit to select a different region, and in response, selecting said different region, and updating the display space; and
receive a navigation command from the remote control unit to select a menu or data content item adjacent to the currently selected one of the menu items of the currently selected region, and in response:
determine the currently selected region,
when it is determined that the second region is currently selected, select the adjacent menu item of the second region, and update the third region with the at least one data content item relating to the currently selected second level menu item;
when it is determined that the third region is currently selected, select the adjacent data content item of the third region; and
update the display space.

18. An apparatus comprising:
a non-transitory storage medium with machine-readable instructions stored thereon which, when executed by a processor, will cause the processor to respond to received user control signals and provide an interactive user interface for a television display, comprising providing at least three continuously displayed non-overlapping regions of the interactive user interface in a display space, wherein the non-overlapping regions provide an electronic program guide for selection of program material by a user, the non-overlapping regions comprising:
a first region having a plurality of top level menu items each associated with a respective section of the electronic program guide, wherein the top level menu items become selectable in response to selection of the first region;
a second region having at least one second level menu item in response to selection of a top level menu item, the or each second level menu item associated with a respective sub-section of the electronic program guide relating to the selected first level menu item, and wherein the or each second level menu item becomes selectable in response to selection of the second region; and
a third region having at least one data content item in response to selection of a second level menu item, the or each data content item providing data content relating, to the selected first and second level menu items, wherein the or each data content item becomes selectable in response to selection of the third region;
outputting, to the television display, the display space identifying at least: a currently selected one of said regions, a currently selected one of the menu items of the currently selected region, and a currently selected one of the menu items of a non-selected region;
receiving a region select command from a remote control unit to select a different region, and in response, selecting said different region, and updating the display space; and
receiving a navigation command from the remote control unit to select a menu or data content item adjacent to the currently selected one of the menu items of the currently selected region, and in response:
determining the currently selected region;
if it is determined that the second region is currently selected, selecting the adjacent menu item of the second region, and updating the third region with the at least one data content item relating to the currently selected second level menu item;
if it is determined that the third region is currently selected selectin the adjacent data content item of the third region; and
updating the display space.

* * * * *